(12) United States Patent
Aruga

(10) Patent No.: US 10,866,495 B2
(45) Date of Patent: Dec. 15, 2020

(54) FLY-EYE LENS AND ILLUMINATION OPTICAL DEVICE

(71) Applicant: NICHIA CORPORATION, Anan (JP)

(72) Inventor: Takanori Aruga, Suwa-gun (JP)

(73) Assignee: NICHIA CORPORATION, Anan (JP)

( * ) Notice: Subject to any disclaimer, the term of this patent is extended or adjusted under 35 U.S.C. 154(b) by 0 days.

(21) Appl. No.: 16/582,691

(22) Filed: Sep. 25, 2019

(65) Prior Publication Data

US 2020/0103731 A1    Apr. 2, 2020

(30) Foreign Application Priority Data

Sep. 28, 2018 (JP) ................. 2018-184342

(51) Int. Cl.
| | |
|---|---|
| *G03B 21/14* | (2006.01) |
| *G03B 21/20* | (2006.01) |
| *H04N 9/31* | (2006.01) |
| *G02B 3/00* | (2006.01) |
| *G03B 21/00* | (2006.01) |

(52) U.S. Cl.
CPC ......... *G03B 21/142* (2013.01); *G02B 3/0006* (2013.01); *G02B 3/0037* (2013.01); *G02B 3/0043* (2013.01); *G03B 21/2033* (2013.01); *H04N 9/31* (2013.01); *G03B 21/006* (2013.01)

(58) Field of Classification Search
CPC .... G03B 21/14; G03B 21/208; G03B 21/142; G03B 21/2033; G03B 21/006; H04N 9/31; H04N 9/3152

USPC .......................................................... 353/38
See application file for complete search history.

(56) References Cited

U.S. PATENT DOCUMENTS

| | | | |
|---|---|---|---|
| 5,997,143 A | 12/1999 | Derra et al. | |
| 10,288,774 B2 * | 5/2019 | Kaneda | ............... G02B 3/0043 |
| 2013/0271735 A1 | 10/2013 | Tanaka | |
| 2020/0249552 A1 * | 8/2020 | Aruga | ................. G03B 21/208 |

FOREIGN PATENT DOCUMENTS

| | | |
|---|---|---|
| JP | 09-054279 A | 2/1997 |
| JP | 09-222581 A | 8/1997 |
| JP | 10-090791 A | 4/1998 |
| JP | 2002-541517 A | 12/2002 |
| JP | 2005-259653 A | 9/2005 |
| JP | 2013-218235 A | 10/2013 |
| WO | WO-00/60412 | 10/2000 |

* cited by examiner

*Primary Examiner* — William C. Dowling
(74) *Attorney, Agent, or Firm* — Foley & Lardner LLP

(57) ABSTRACT

A fly-eye lens includes: an incident lens assemblage comprising a plurality of incident lenses that are aligned in a vertical direction, wherein each of the incident lenses has a quadrangular shape, wherein horizontal lens widths of the incident lens are the same, and wherein vertical lens widths of at least some of the incident lens are different from one another; and an emission lens assemblage comprising a plurality of emission lenses that are aligned in the vertical direction so as to be optically opposed to the incident lenses, wherein each of the emission lenses has a quadrangular shape, and wherein horizontal lens widths of the emission lenses lens are the same.

22 Claims, 23 Drawing Sheets

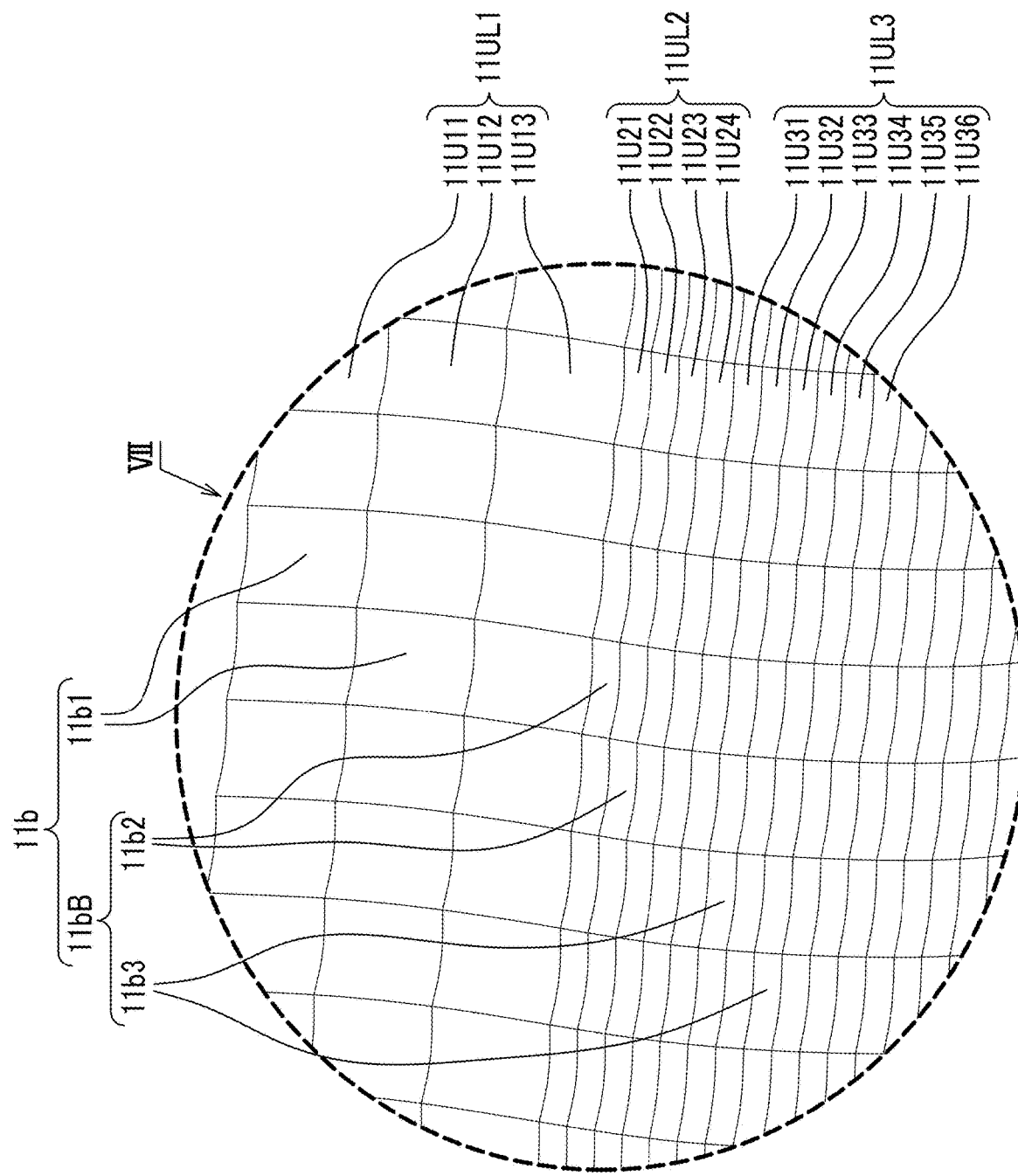

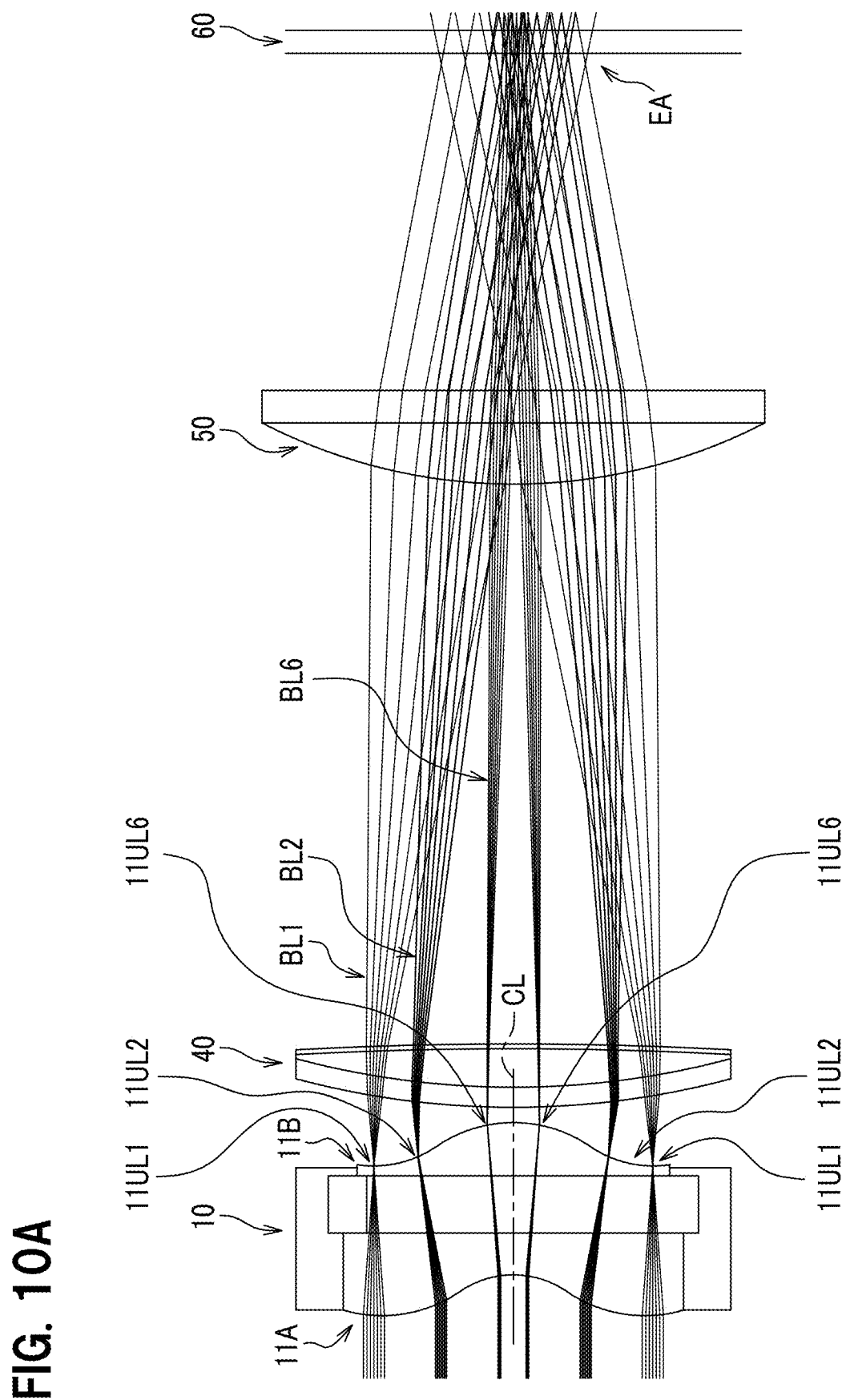

FIG. 12A
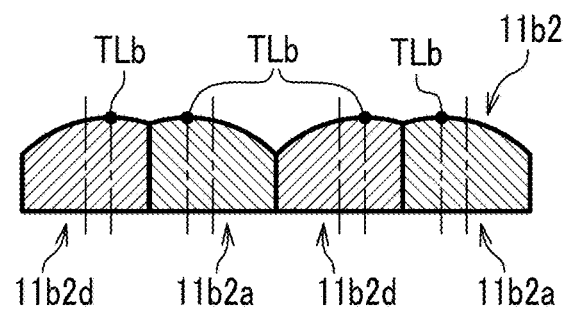
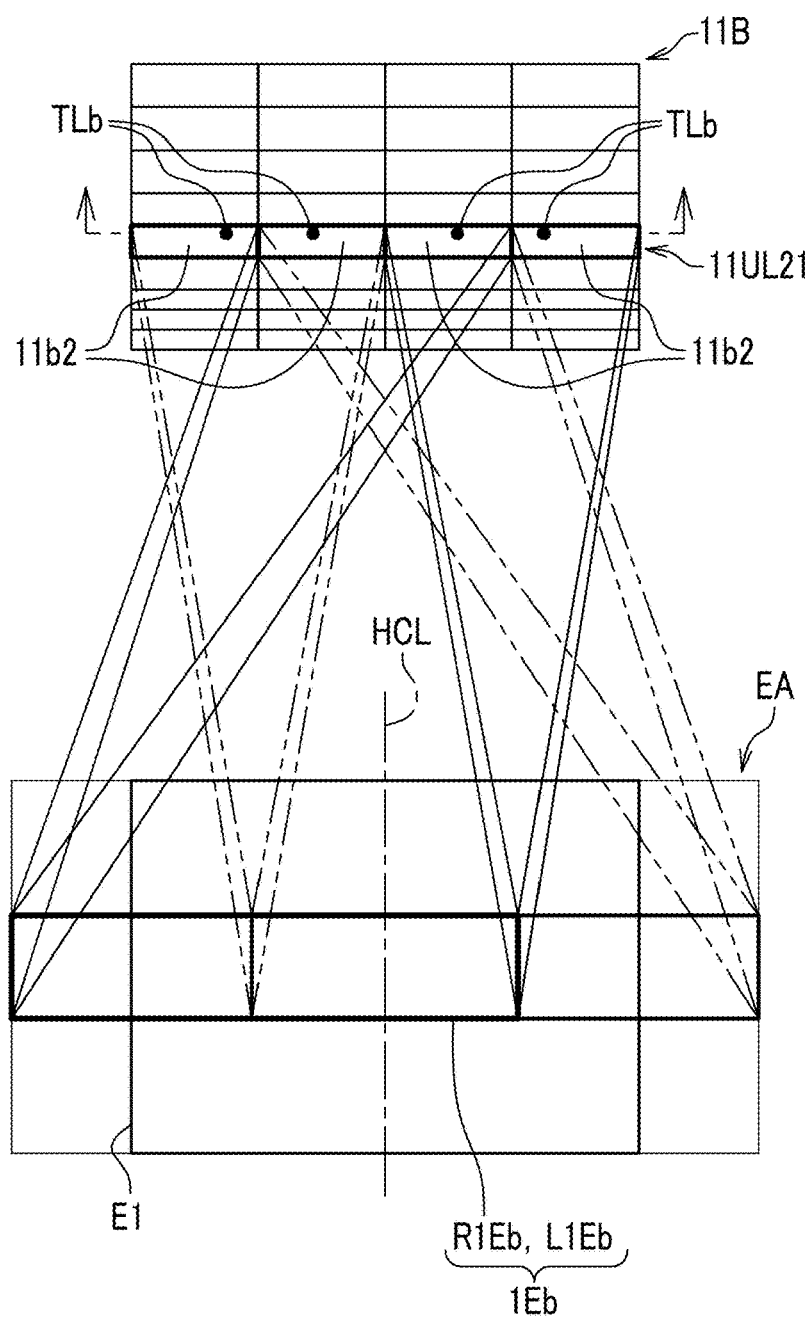

FLY-EYE LENS AND ILLUMINATION OPTICAL DEVICE

CROSS-REFERENCE TO RELATED APPLICATIONS

The present application claims priority to Japanese Application No. 2018-184342, filed on Sep. 28, 2018, which is incorporated by reference in its entirety.

BACKGROUND

1. Technical Field

The present disclosure relates to a fly-eye lens and an illumination optical device.

2. Description of Related Art

Recent years have seen numerous attempts to develop an ADB (adaptive driving beam) as an applied product of a spatial light modulation element such as an LCD (liquid crystal device), an LCOS (liquid crystal on silicon), a DMD (digital micromirror device) and the like. A conventional illumination optical device includes a light source, an incident lens, and an emission lens. In the illumination optical device, at least one aperture of the incident lens has a shape smaller than a shape formed just on the illuminated surface. The plane distribution in the illuminated surface is adjusted so that illuminance is higher about the center of the illuminated surface and lower toward the periphery (see paragraph 0007 in JP 09-222581 A).

SUMMARY

In order to provide an uneven illumination distribution as in JP 09-222581 A, the conventional illumination optical device requires a portion where adjacent ones of simple lenses are very different in size in each of the incident lens and the emission lens. Hence, the emission lens or the incident lens includes a great step height at the portion where adjacent ones of simple lenses are connected. That is, when an uneven illumination distribution is desired, the step height in the incident lens or the emission lens becomes great and manufacturing thereof becomes difficult.

An object of certain embodiments of the present disclosure is to provide a fly-eye lens and an illumination optical device without a great step height despite lenses being configured to provide an uneven illumination distribution.

A fly-eye lens according to an embodiment of the present disclosure includes: an incident lens assemblage having incident lenses of a quadrangular shape aligned in a vertical direction, the incident lenses being different from one another in a vertical lens width and the same as one another in a horizontal lens width; and an emission lens assemblage having emission lenses of a quadrangular shape aligned in the vertical direction so as to be optically opposed to the incident lenses, the emission lenses being the same as one another in the horizontal lens width. The incident lenses have a dimension of the quadrangular shape set so that a preset illumination region is attained by a group of illumination ranges respectively illuminated with light from one or more of the incident lenses in an illuminated surface, and have their lens vertices eccentrically positioned so as to supply light to the emission lenses optically opposed to the incident lenses. The emission lenses have a dimension of the quadrangular shape and their lens vertices positioned so that any of the plurality of illumination ranges forming the illumination region is attained, and so that at least part of the illumination ranges are overlapped on each other.

A fly-eye lens according to another embodiment of the present disclosure includes: an incident lens assemblage formed of first incident lenses of a quadrangular shape and second incident lenses of a quadrangular shape of which horizontal lens width is equivalent to a horizontal lens width of the first incident lenses and of which vertical lens width is smaller than a vertical lens width of the first incident lenses, the first incident lenses and the second incident lenses being aligned in a vertical direction and a horizontal direction with their horizontal lens width being the same in a vertical column; and an emission lens assemblage formed of first emission lenses of a quadrangular shape optically opposed to the first incident lenses and second emission lenses of a quadrangular shape optically opposed to the second incident lenses, the first emission lenses and the second emission lenses being aligned in the vertical direction and the horizontal direction with their horizontal lens width being the same in a vertical column. The first incident lenses have a dimension of the quadrangular shape set so that a preset first illumination region is attained in an illuminated surface, and have their lens vertices positioned so as to supply light to the first emission lenses optically opposed to the first incident lenses. The second incident lenses have a dimension of the quadrangular shape set so that a second illumination region smaller in area than the first illumination region and being at least partially overlapped on the first illumination region in an illuminated surface, and have their lens vertices positioned so as to supply light to the second emission lenses optically opposed to the second incident lenses. The first emission lenses have a dimension of the quadrangular shape set and lens vertices eccentrically positioned so as to emit light in the first illumination region. The second emission lenses have a dimension of the quadrangular shape set and lens vertices positioned so as to emit light in the second illumination region.

An illumination optical device according to another embodiment of the present disclosure includes: a first optical member disposed on an optical path from a light source and configured to convert light from the light source to a substantially collimated light beam; a fly-eye lens configured to receive light from the first optical member and emit the light with a desired gray scale distribution; a second optical member disposed on an optical path of the light from the fly-eye lens; a light modulation device configured to receive light from the second optical member and emit the light with its optical path changed; and a projection lens configured to project the light from the light modulation device. The fly-eye lens is the above-described fly-eye lens.

The fly-eye lens according to certain embodiments of the present disclosure does not include a great step height despite an uneven illumination distribution of its lens configuration.

The illumination optical device according to certain embodiments of the present disclosure does not include a great step height despite lenses being configured to provide an uneven illumination distribution. Therefore the illumination optical device may be easily manufactured. For example, an illumination region suitable for a headlamp may be formed.

BRIEF DESCRIPTION OF THE DRAWINGS

FIG. 7 is a schematic enlarged view of a region VII in FIG. 6.

FIG. 10A is an explanatory illustration schematically showing, with some omissions, the relationship between light emitted in the vertical direction of the fly-eye lens according to the first embodiment and an illumination region.

FIG. 12A is an explanatory illustration for describing the relationship between light emitted from emission 1st lens rows in a second emission lens of a fly-eye lens according to other variation and a first range of a second illumination region.

DETAILED DESCRIPTION

Figure 1:
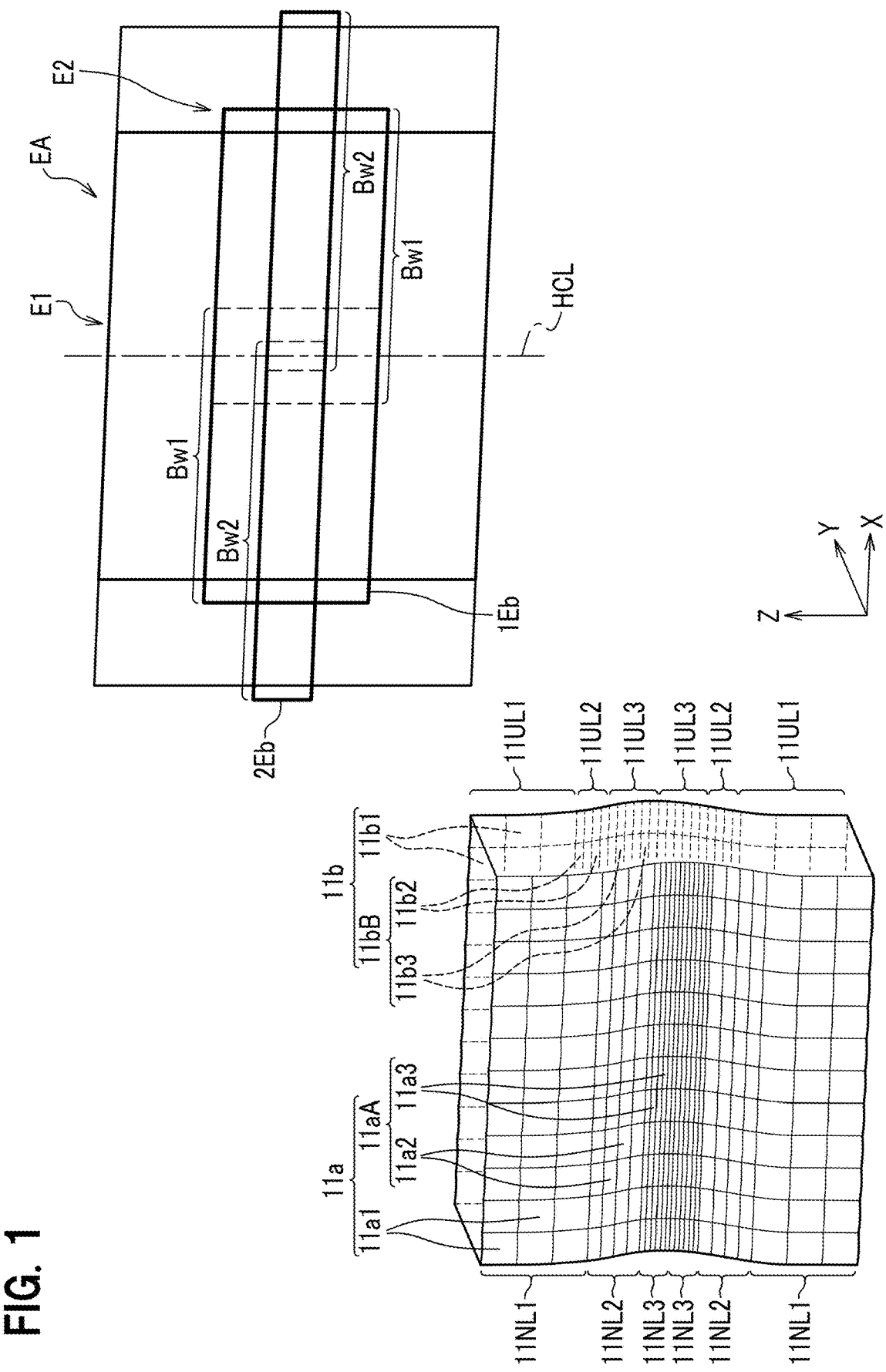
FIG. 1 is a perspective view schematically showing the relationship between a fly-eye lens and an illumination region according to a first embodiment.

Embodiments of the present invention will be described below with reference to the drawings as appropriate. The embodiments described below are merely examples for explaining the technical ideas of the present invention. However, the present invention is not limited to the described embodiments unless otherwise specified. Furthermore, the size, positional relationship and the like of members shown in the drawings may be exaggerated for the sake of clarity. The description with reference to the drawings is given on the premise that, as an example, the top-bottom direction of the fly-eye lens is the Z-direction, the width direction of the fly-eye lens is the X-direction, and the thickness direction of the fly-eye lens is the Y-direction. The fly-eye lens has the incident lens assemblage on its front side.

Overview of Fly-Eye Lens and Illumination Region

Figure 2:
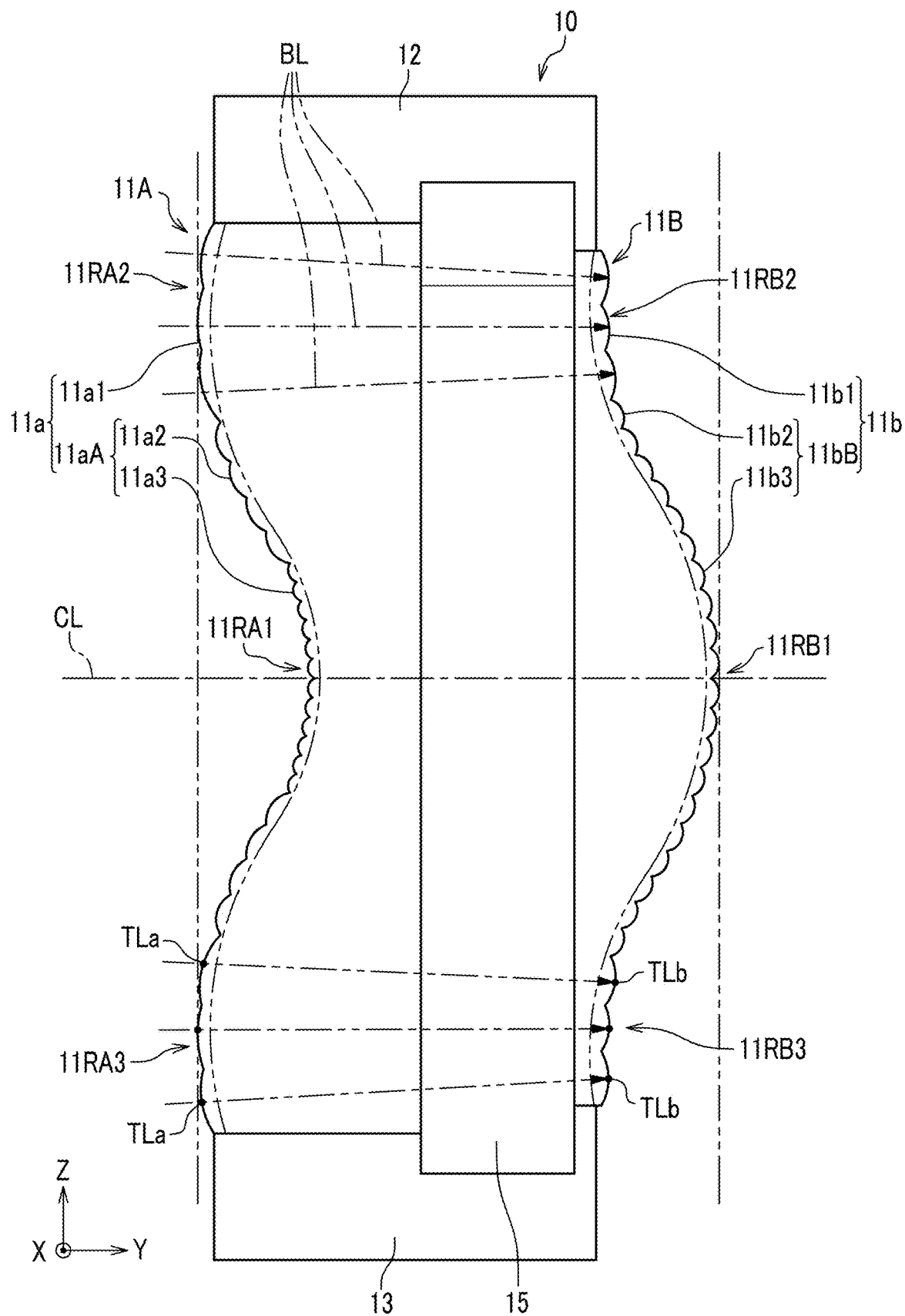
FIG. 2 is a schematic side view of the fly-eye lens according to the first embodiment.
Figure 3:
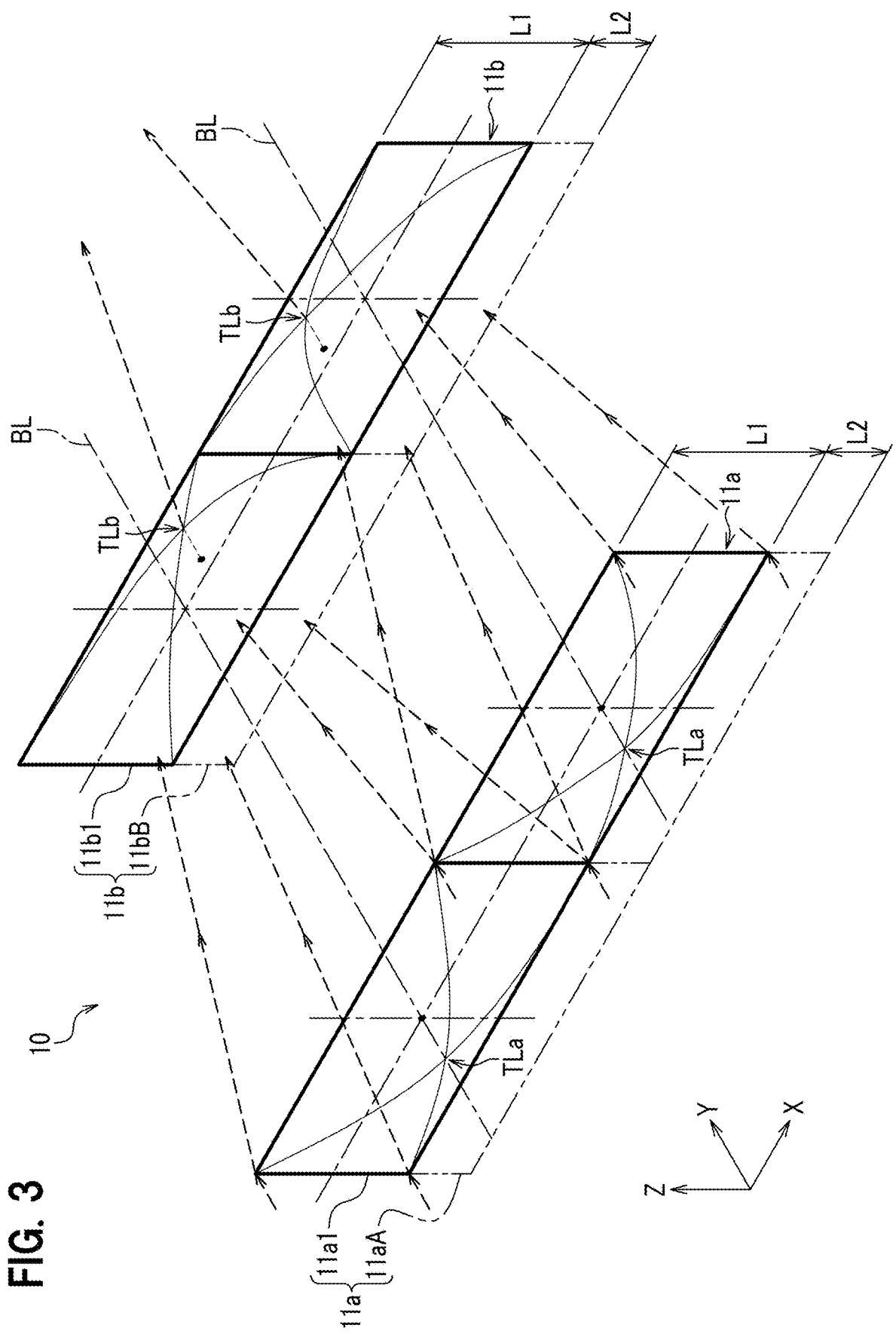
FIG. 3 is a perspective view schematically showing an optical opposing relationship between second incident lenses and second emission lenses according to the first embodiment.
Figure 4:
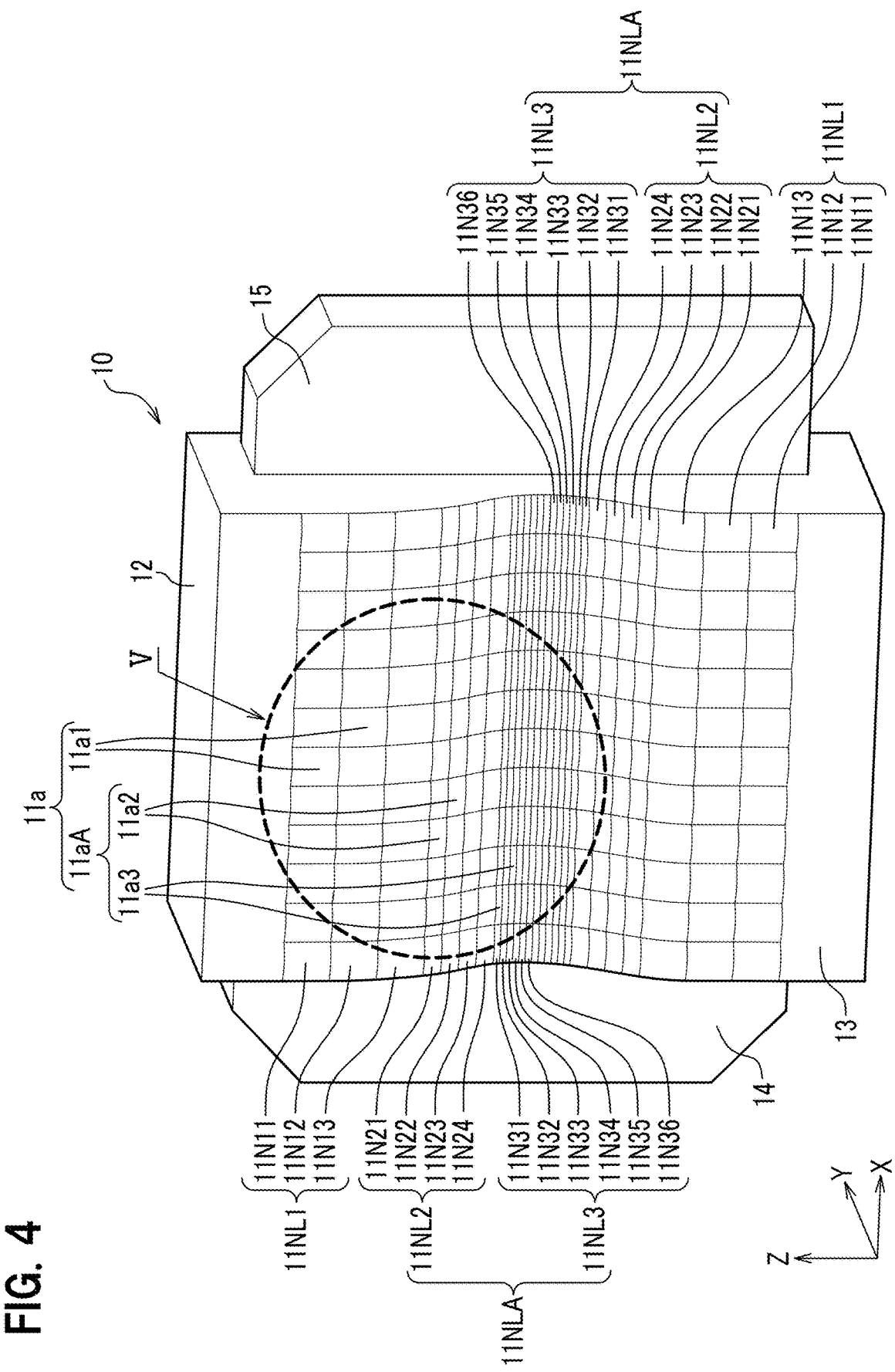
FIG. 4 is a schematic perspective view of the incident lens assemblage side of the fly-eye lens according to the first embodiment.
Figure 6:
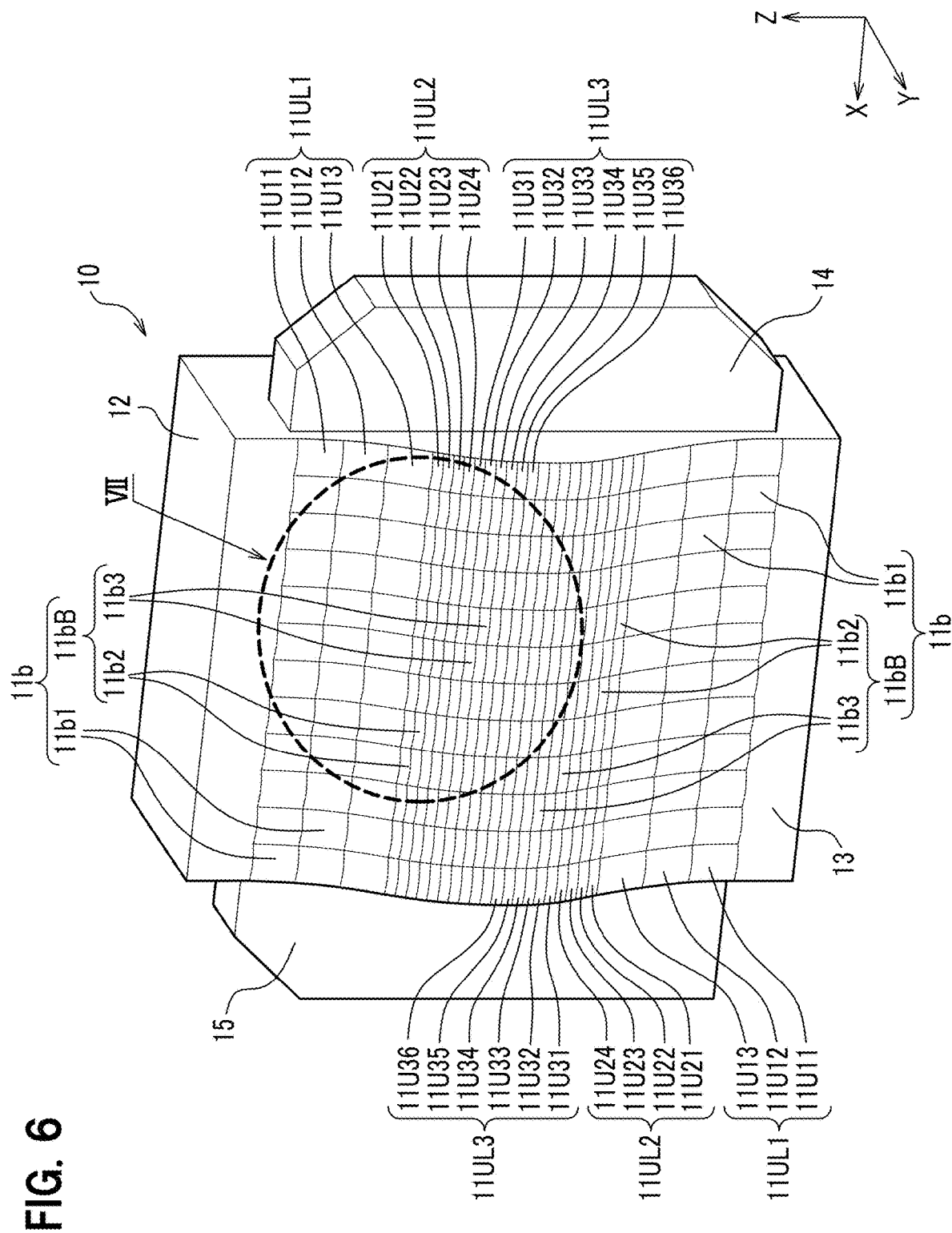
FIG. 6 is a perspective view schematically showing the emission lens side of the fly-eye lens according to the first embodiment.
Figure 10B:
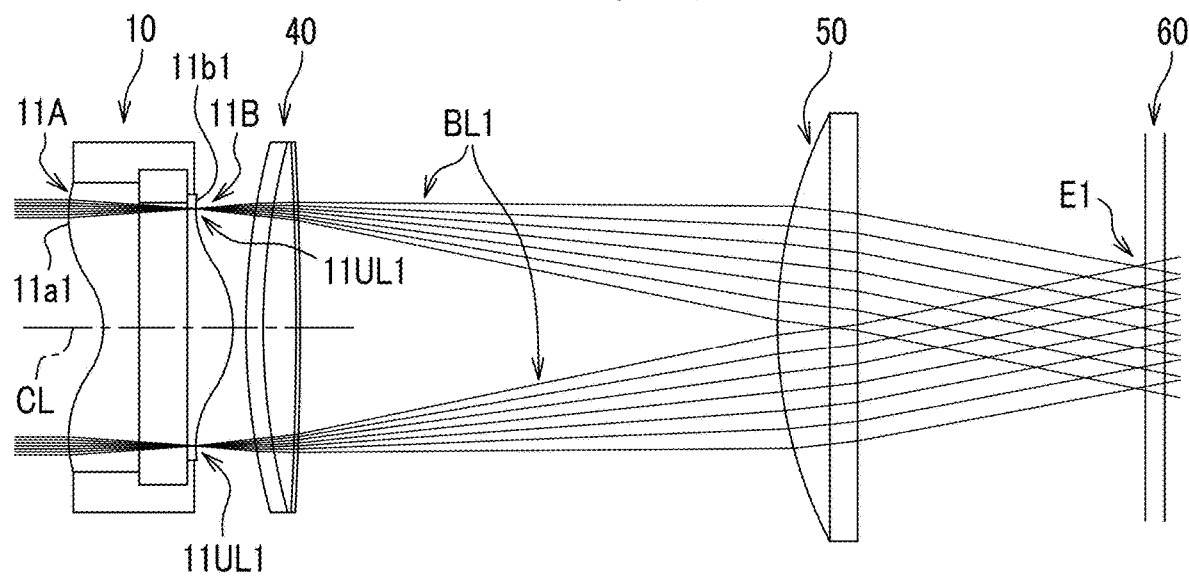
FIG. 10B is an explanatory illustration schematically showing the relationship between light emitted from the first emission lens in the vertical direction of the fly-eye lens according to the first embodiment and the first illumination region in the light modulation part of the light modulation device.

As shown in FIGS. 1, 2, and 10A, a fly-eye lens 10 is configured to receive light at incident lenses 11a, and emit the light via emission lenses 11b so that the light attains a predetermined light illumination intensity distribution in a predetermined illumination region. As shown in FIGS. 4 and 6, the fly-eye lens 10 includes a plurality of incident lenses 11a and a plurality of emission lenses 11b aligned in the vertical direction (the Z-direction) and the horizontal direction (the X-direction) using a lens upper frame part 12, a lens lower frame part 13, a lens left frame part 14, and a lens right frame part 15. As shown in FIGS. 2 and 3, the incident lenses 11a and the emission lenses 11b are disposed at positions optically opposed to each other, having the size and the position of the lens vertices set for each illumination region. Note that, as an example, in the first embodiment, as to the dimension (size) of the incident lenses 11a and the emission lenses 11b of the fly-eye lens 10, the incident lenses 11a and the emission lenses 11b have the same horizontal lens width and three different vertical lens widths.

As shown in FIG. 1, an illumination region EA of the fly-eye lens 10 is roughly set by a first illumination region E1 and a second illumination region E2. The illumination region EA is set to present a predetermined light illumination intensity distribution entirely or partially by the first illumination region E1 and the second illumination region E2. The second illumination region E2 is set by a plurality of ranges, and the description is exemplarily given of the second illumination region E2 set by two ranges, namely, a first range 1Eb and a second range 2Eb. As shown in FIGS. 10A, 9B to 9D, the fly-eye lens 10 is formed having lens vertices TLb of the emission lenses 11b eccentrically positioned so that, as the lens groups are nearer to a lens surface center CL, the regions of light beams emitted from respective lens groups spread in the X-direction (the horizontal direction), and an overlapped regions formed by such regions at a region center HCL gradually becomes smaller. That is, a first emission lens group 11UL1 shown in FIG. 9B is disposed farthest from the lens surface center CL, to emit light that is near to the region center HCL. An emission 2nd lens group 11UL3 shown in FIG. 9D is disposed nearest to the lens surface center CL, to emit light including those far from the region center HCL in the horizontal direction.

Note that, as shown in FIGS. 2 and 3, the incident lenses 11a and the emission lenses 11b being "optically opposed to each other" means that they are opposed to each other for causing light (BL) emitted from one incident lens 11a to become incident on one emission lens 11b. In FIG. 1, as to the first range 1Eb and the second range 2Eb of the second illumination region E2, one light range Bw1 or one range Bw2 illuminated with light from one second emission lens 11bB is represented by a solid line and a broken line. A solid line represents the entire first range 1Eb consisting of two ranges Bw1 or the entire second range 2Eb consisting of two ranges Bw2. The first illumination region E1 is also represented as the range of a group of a first range 1Ea to a fifth range 5Ea (the total illumination area) (see FIG. 8A).

Figure 8A:
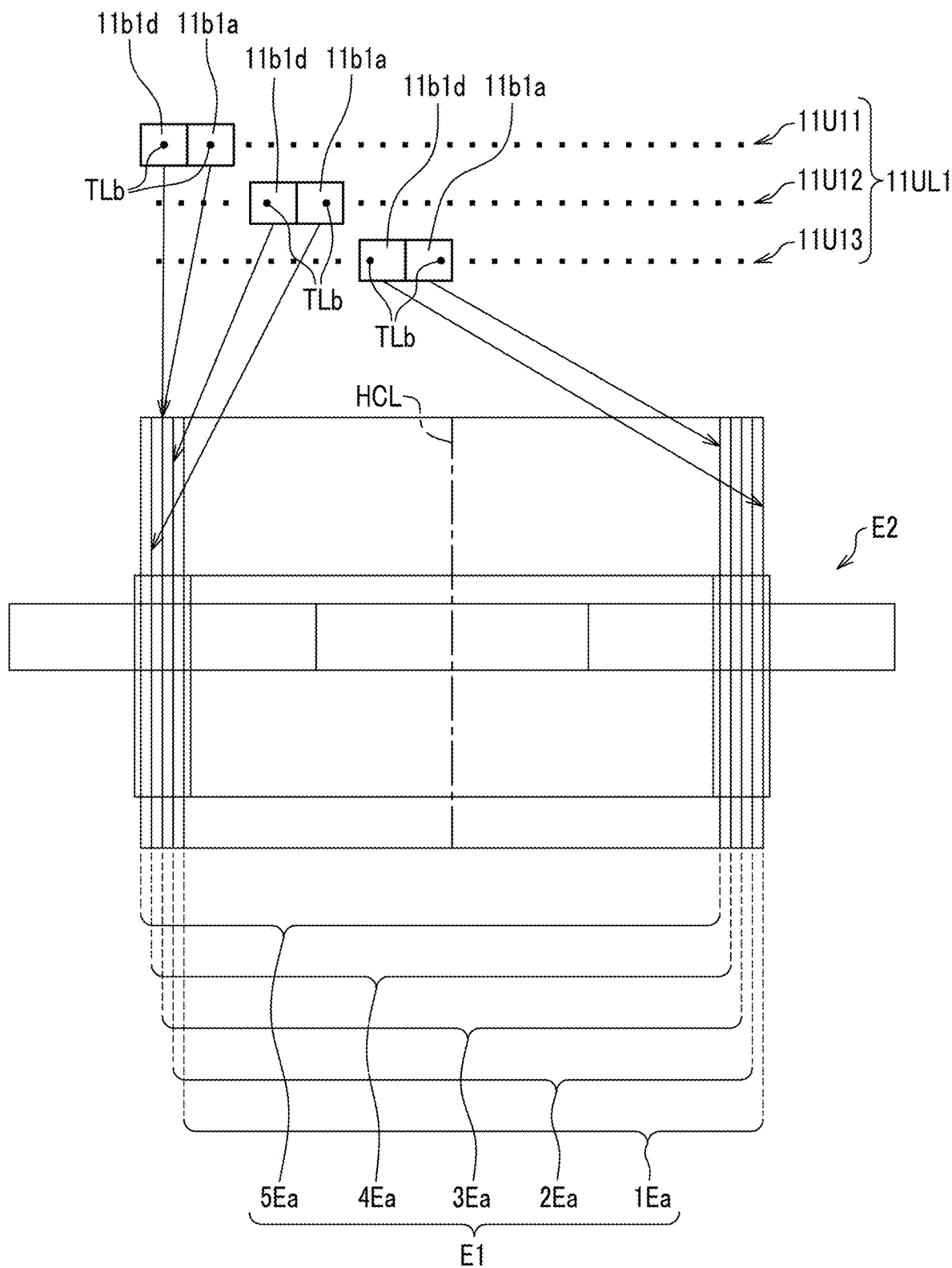
FIG. 8A is an explanatory illustration for describing the configuration of a first illumination region and a second illumination region provided by the fly-eye lens according to the first embodiment illuminating a light modulation part of a light modulation device.

As shown in FIG. 1, the first illumination region E1 and the second illumination region E2 refer to regions set in the preset illumination region EA. The second illumination region E2 refers to a region that at least is partially overlapped on the first illumination region E1, and that is smaller in area than the first illumination region E1. As an example, as shown in FIG. 8A, the first illumination region E1 is set as one region consisting of a plurality of illuminated ranges, namely, the first range 1Ea to the fifth range 5Ea. The second illumination region E2 in the present embodiment is set as a plurality of regions and, as an example, as a group of two regions.

That is, the second illumination region E2 consists of the first range (illumination range) 1Eb and the second range (illumination range) 2Eb. So long as at least one of the first range 1Eb and the second range 2Eb is partially overlapped on the first illumination region E1, the second illumination region E2 may be set to partially project outward of the illumination region EA. The first range 1Eb and the second range 2Eb have vertical symmetry with reference to the region center HCL in the X-direction of the illumination region EA. In the drawings, those lines representing light, and lines representing a region, a range, a section, a subsection illuminated with light are provided merely for the sake of easier understanding, and do not actually exist. The description will be exemplarily given of a quadrangular-shaped lens, and the lens size substantially means the dimension of the quadrangular shape (the horizontal lens width and the vertical lens width).

Incident Lenses

In the following, with reference to FIGS. 1 to 8C, a description will be given of the incident lenses 11a.

The incident lenses 11a are configured to receive light from a light source, and supply the light to the optically opposed emission lenses 11b. The incident lenses 11a are quadrangular convex lenses that are the same as one another in the horizontal lens width and different from one another in the vertical lens width. The incident lenses 11a include first incident lenses 11a1 and second incident lenses 11aA. The incident lenses 11a are arranged in a matrix (XZ-directions: horizontal and vertical directions) adjacent to one another, to form an incident lens assemblage 11A. As shown in FIG. 2, when aligned, the incident lenses 11a present a wavy lens surface having lens vertices TLa connected in the incident lens assemblage 11A. That is, the lens assemblage 11A has a curved wavy lens surface as seen in a side view in which, while being parallel to one another in the horizontal direction, an incident-side concave surface 11RA1 and incident-side convex surfaces 11RA2, 11RA3 are continuous to one another in the vertical direction.

In the present embodiment, the incident lens assemblage 11A is provided with the incident-side concave surface 11RA1 at the position of the lens surface center CL in the vertical direction (the Z-direction). On the upper and lower sides of the incident-side concave surface 11RA1, the incident-side convex surfaces 11RA2, 11RA3 are formed. The incident-side concave surface 11RA1 and the incident-side convex surfaces 11RA2, 11RA3 are formed in accordance with the height of the lens vertices TLa or the shape of the incident lenses 11a.

In the incident lens assemblage 11A, the second incident lenses 11aA are different from each other in the vertical lens width corresponding to respective illumination regions. The lenses with a smaller vertical lens width are disposed nearer to the lens surface center CL. In the incident lens assemblage 11A, the vertical lens width of the lenses becomes gradually greater from the lens surface center CL toward the upper and lower edges. Thus, in the incident lens assemblage 11A, the incident-side concave surface 11RA1 is formed at the portion corresponding to the lens surface center CL. On the upper side relative to the lens surface center CL, the incident-side convex surfaces 11RA2 is formed. On the lower side relative to the lens surface center CL, the incident-side concave surface 11RA3 is formed.

First Incident Lenses

As shown in FIGS. 4 to 7, the first incident lenses 11a1 are configured to supply light to the first emission lenses 11b1 that emit the light in the first illumination region E1. The first incident lenses 11a1 are lenses of the same shape aligned in one or more rows. As an example, from the upper level to the lower level in the incident lens assemblage 11A, the first incident lenses 11a1 are aligned in first to third rows to form an incident 1st lens row 11N11 to an incident 3rd lens row 11N13. In the first incident lenses 11a1, the incident 1st lens row 11N11 to the incident 3rd lens row 11N13 are a first incident lens group 11NL1. The first incident lens group 11NL1 is formed of the first incident lenses 11a1 of the same vertical lens width and the same horizontal lens width being aligned in a plurality of rows in the present embodiment. The first incident lens group 11NL1 is disposed at each of two locations that have horizontal symmetry with reference to the lens surface center CL in the Z-direction.

In the present embodiment, each of the first incident lens groups 11NL1 is a group of three rows of the incident 1st lens row 11N11 to the incident 3rd lens row 11N13 in which the first incident lenses 11a1 of the same size (dimension) are arranged. The first incident lens groups 11NL1 are respectively disposed at the higher level and the lower level, to form part of the incident lens assemblage 11A. Each first incident lens group 11NL1 have the lens vertices TLa eccentrically positioned so as to cause light from the first incident lenses 11a1 become incident on the opposite first emission lenses 11b1. The size and eccentricity of the lens vertices TLa of the incident lenses 11a are set so as to cause light to become incident on the optically opposed emission lenses 11b and to set the ranges of the illumination region. As an example, in the first incident lens group 11NL1, each of the first incident lenses 11a1 is a quadrangular convex lens. Accordingly, the first incident lenses 11a1, which are convex lenses, have the lens vertices TLa set to allow light to become incident on the optically opposed first emission lenses 11b1. As for the size of each first incident lens 11a1, the vertical lens width and the horizontal lens width are designed to set the first illumination region E1. Note that, the first illumination region E1 corresponds to the total of overlapped and aligned similar shapes of the first incident lens 11a1. The vertical lens width and the horizontal lens width of the incident lenses 11a are reflected on illuminated region that is illuminated as a substantially similar shape of the first incident lens 11a1 corresponding to the vertical region size and the horizontal region size. Note that, as shown in FIG. 1, in the incident second lenses 11aA, the incident 1st lenses 11a2 are reflected on an illuminated range Bw1 that is similar in the horizontal lens width. In the incident second lenses 11aA, the incident 2nd lenses 11a3 are reflected on an illuminated range Bw2 that is similar in the horizontal lens width.

Second Incident Lenses

The second incident lenses 11aA are configured to supply light to the second emission lenses 11bB that illuminate the second illumination region E2. Each of the second incident lenses 11aA is a quadrangular convex lens that is the same as the first incident lens 11a1 in the horizontal lens width and smaller than the first incident lens 11a1 in the vertical lens width. Preferably, the vertical lens width of the second incident lens 11aA is 50% or less as great as the vertical lens width of the first incident lens 11a1. By virtue of the second incident lenses 11aA having the vertical lens width that is 50% or less as great as that of the first incident lenses 11a1, numerous small illumination regions can be set in the entire illumination region. This improves flexibility in setting the light distribution of the illumination region. In the second incident lenses 11aA, lens groups differing from each other in the vertical lens width are aligned respectively in rows so as to have horizontal symmetry with reference to the lens surface center CL of the incident lens assemblage 11A. The vertical lens width of the second incident lens 11aA is designed corresponding to the number of the first range 1Eb and the second range 2Eb in the second illumination region E2.

Figure 5:
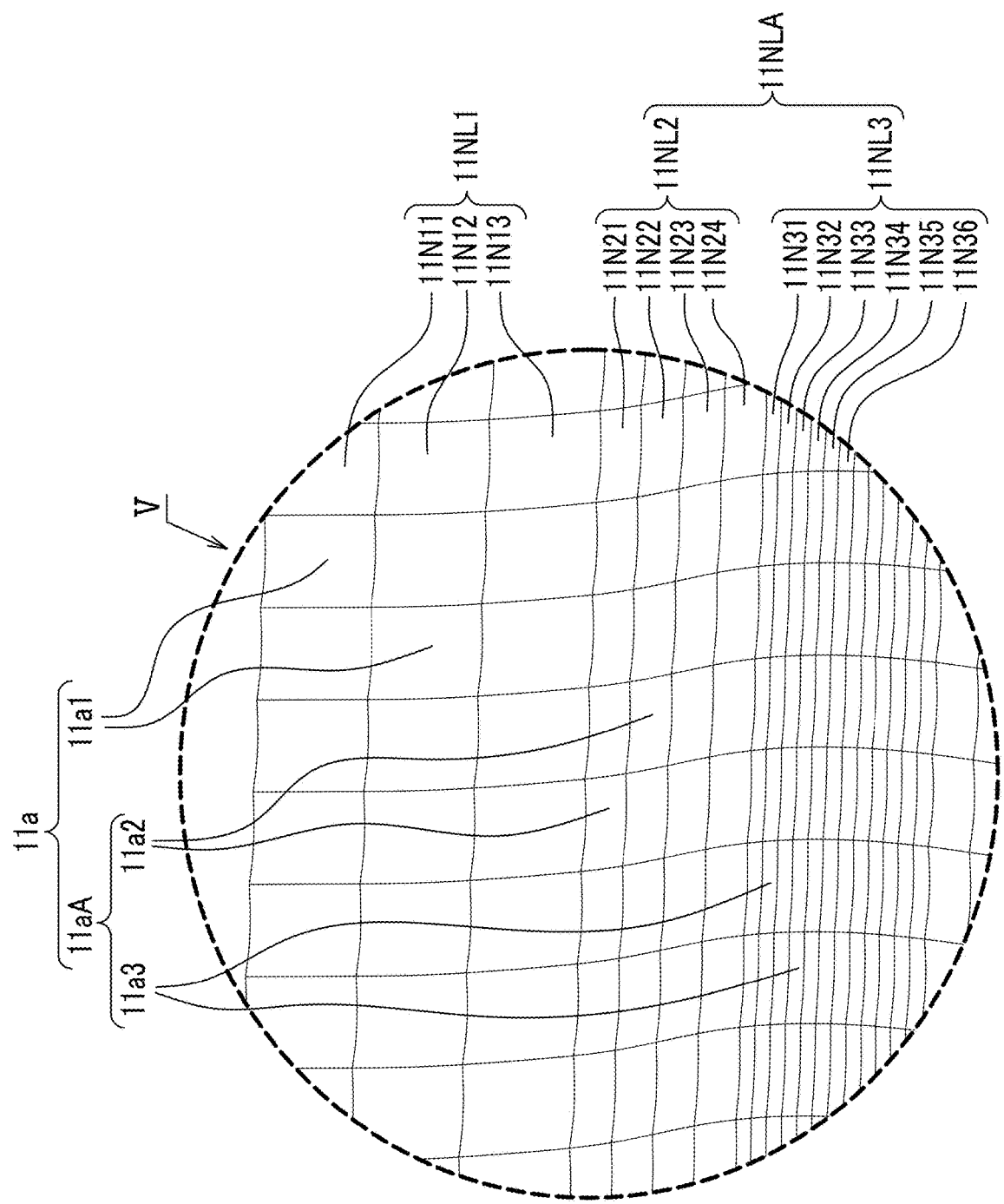
FIG. 5 is an enlarged schematic view of a region V in FIG. 1.

As shown in FIGS. 4 and 5, as an example, in the case in which the second incident lenses 11aA emit light separately in two ranges, the second incident lenses 11aA are designed to have two different vertical lens widths. In the present embodiment, the second incident lenses 11aA include incident 1st lenses 11a2 and incident 2nd lenses 11a3. The second incident lenses 11aA are aligned in the horizontal direction to form each row. The incident 1st lenses 11a2 and the incident 2nd lenses 11a3 are each formed as a group of a preset number of lens rows. The group of the incident 1st lenses 11a2 and the group of the incident 2nd lenses 11a3 form a second incident lens group 11NLA. That is, the second incident lens group 11NLA includes, in the present embodiment, an incident 1st lens group 11NL2 and an incident 2nd lens group 11NL3. Accordingly, the second incident lens group 11NLA is formed of, excluding the first incident lens group 11NL1 formed of the first incident lenses 11a1, the second incident lenses 11aA that is a cluster of lens groups differing from each other in the vertical lens width.

Incident 1st Lenses

The incident 1st lenses 11a2 are formed having the lens vertices TLa eccentrically positioned so as to cause light to become incident on the emission 1st lenses 11b2 of the optically opposed second emission lenses 11bB. The incident 1st lenses 11a2 are smaller in the vertical lens width than the first incident lenses 11a1, and greater in the vertical lens width than the incident 2nd lenses 11a3. In the present embodiment, the incident 1st lenses 11a2 are the same in size and aligned in four rows, namely, an incident 1st lens row 11N21 to an incident 4th lens row 11N24. The incident 1st lens row 11N21 to the incident 4th lens row 11N24 form an incident 1st lens group 11NL2 in which all the incident 1st lenses 11a2 in the four rows have the same size.

The incident 1st lenses 11a2 are aligned respectively continuous to the upper and lower first incident lens groups 11NL1 of the first incident lenses 11a1. That is, the incident 1st lens row 11N21 to the incident 4th lens row 11N24 are formed as an incident 1st lens group 11NL2 at each of two locations, that is, one from the higher level to the lower level in the incident lens assemblage 11A, and other from the lower level to the higher level in the incident lens assemblage 11A. In the present embodiment, the incident 1st lens groups 11NL2 are formed to be continuous to the first incident lens groups 11NL1 so as to have horizontal symmetry with reference to the lens surface center CL.

The lens size of the incident 1st lenses 11a2 is designed so that the first range 1Eb in the second illumination region E2 is set by one or more lenses. In the present embodiment, the first range 1Eb is formed by ranges respectively illuminated by at least two incident 1st lenses 11a2. The first range 1Eb is set to be an overlapped region (a group of regions) of respective illumination ranges of the incident 1st lenses 11a2 in four rows of the incident 1st lens row 11N21 to the incident 4th lens row 11N24. Note that, the first range 1Eb in FIG. 1 is the total of a plurality of aligned shapes each substantially similar to one lens size of the incident 1st lenses 11a2. That is, in the present embodiment, the first range 1Eb is formed as a maximum area illuminated by light from two incident 1st lenses 11a2. Therefore, a range of the illuminated area by one incident 1st lens 11a2 has the shape substantially similar to the lens size. The same holds true for other second range 2Eb, which will be described later.

Incident 2nd Lenses

The incident 2nd lenses 11a3 are formed having the lens vertices TLa eccentrically positioned so as to cause light to become incident on the emission 2nd lenses 11b3 of the optically opposed second emission lenses 11bB. The incident 2nd lenses 11a3 are smaller in the vertical lens width than the incident 1st lenses 11a2. The incident 2nd lenses 11a3 are the same in size and aligned in six rows, namely, an incident 1st lens row 11N31 to an incident 6th lens row 11N36.

The incident 1st lens row 11N31 to the incident 6th lens row 11N36 form the incident 2nd lens group 11NL3 in which all the incident 2nd lenses 11a3 in the six rows have the same size. The incident 2nd lenses 11a3 are aligned respectively continuous to the upper and lower incident 1st lens groups 11NL2 of the incident 1st lenses 11a2.

That is, the incident 1st lens row 11N31 to the incident 6th lens row 11N36 are formed as the incident 2nd lens group 11NL3 at each of two locations, that is, one from the higher level to the lower level in the incident lens assemblage 11A, and other from the lower level to the higher level in the incident lens assemblage 11A. In the present embodiment, the incident 2nd lens groups 11NL3 are formed to be continuous to the incident 1st lens groups 11NL2 so as to have horizontal symmetry with reference to the lens surface center CL. That is, the incident 1st lens row 11N31 to the incident 6th lens row 11N36 are formed as two continuous groups at the center of the incident lens assemblage 11A.

The size of the incident 2nd lenses 11a3 is designed so that the second range 2Eb in the second illumination region E2 is set by one or more lenses. The second range 2Eb is formed by a maximum range illuminated by two incident 2nd lenses 11a3. More specifically, the second range 2Eb is set to be an overlapped region (a group of regions) of respective illumination ranges of six rows, namely, the incident 2nd lens row 11N31 to the incident 6th lens row 11N36. Note that, the second range 2Eb in FIG. 1 is the total of a plurality of aligned shapes each substantially similar to one lens size of the incident 2nd lenses 11a3.

While it has been described that the incident lenses 11a have the lens vertices TLa eccentrically positioned so as to cause light to become incident on the emission lenses 11b, the eccentric positioning referred to herein also includes positioning the lens vertices TLa so as to coincide with the optical axes of the lenses. That is, the incident lenses 11a are just required to have the lens vertices TLa formed so as to be capable of supplying light to the opposed emission lenses 11b.

Emission Lenses

Next, with reference to FIGS. 1 to 10D, a description will be given of the emission lenses 11b. In the present embodiment, in an emission lens assemblage 11B, the emission lenses 11b all have the same size (dimension) as to the horizontal lens width.

The emission lenses 11b are configured to receive light from the incident lens 11a, and emit the light to illumination regions in a preset direction. In the present embodiment, the emission lenses 11b are quadrangular convex lenses that are the same as one another in the horizontal lens width and different from one another in the vertical lens width. The emission lenses 11b are arranged in a matrix (the X-direction and the Z-direction) at positions optically opposed to the incident lenses 11a to receive light therefrom. The emission lenses 11b include first emission lenses 11b1 and second emission lenses 11bB. By the first emission lenses 11b1 and the second emission lenses 11bB of the emission lenses 11b being aligned adjacent to one another, the emission lens assemblage 11B is formed.

Note that, as shown in FIG. 2, when aligned, the emission lenses 11b present a wavy lens surface having lens vertices TLb connected in the emission lens assemblage 11B. That is, the lens assemblage 11B has a curved wavy lens surface as seen in a side view in which, while being parallel to one another in the horizontal direction (the X-direction: the row direction), an emission-side convex surface 11RB1 and emission-side concave surfaces 11RB2, 11RB3 are continuous to one another in vertical direction. The emission lens assemblage 11B is formed corresponding to the height of the lens vertices TLb and the lens shape, and parallel to the incident lens assemblage 11A.

That is, in the emission lens assemblage 11B, the portion corresponding to the lens surface center CL is the emission-side convex surface 11RB1. On the upper side relative to the emission-side convex surface 11RB1, the emission-side concave surface 11RB2 is formed. On the lower side relative to the lens surface center CL, the emission-side concave surface 11RB3 is formed.

In the emission lens assemblage 11B, the second emission lenses 11bB are different in the vertical lens width for each lens group corresponding to illumination regions. The second emission lenses 11bB of which vertical lens width is smaller are disposed nearer to the lens surface center CL.

In the emission lens assemblage 11B, the vertical lens width becomes gradually greater from the lens surface center CL toward the upper and lower edges. That is, in the emission lens assemblage 11B, the vertical lens width is set to have horizontal symmetry with reference to the lens surface center CL. Note that, the emission lenses 11b are all the same as one another in the horizontal lens width in the emission lens assemblage 11B. Furthermore, the emission lenses 11b are also the same in the horizontal lens width to the incident lenses 11a.

First Emission Lenses

The first emission lenses 11b1 are configured to receive light from the first incident lenses 11a1 and emit the light in the first illumination region E1. The first emission lenses 11b1 are lenses of the same shape aligned in one or more rows. As an example, from the higher level to the lower level in the emission lens assemblage 11B, the first emission lenses 11b1 are aligned in the first to third rows to form an emission 1st lens row 11U11 to an emission 3rd lens row 11U13. In the first emission lenses 11b1, the emission 1st lens row 11U11 to the emission 3rd lens row 11U13 are the first emission lens group 11UL1. The first emission lens group 11UL1 is formed of first emission lenses 11b1, which are quadrangular convex lenses, of the same vertical lens width and the same horizontal lens width arranged in a plurality of (three) rows in the present embodiment. The first emission lens group 11UL1 is disposed so as to oppose to the first incident lens group 11NL1. The first emission lens group 11UL1 is disposed at each of two locations that have horizontal symmetry with reference to the lens surface center CL in the Z-direction.

First Emission Lenses and Corresponding Illumination Region

Each first emission lens group 11UL1 has the lens vertices TLb positioned so as to cause light from the first incident lenses 11a1 to be emitted in the plurality of ranges (see FIG. 8A) in the first illumination region E1. In the first emission lens group 11UL1, the lens vertex TLb is different for each of the first to third rows of the first emission lenses 11b1.

As shown in FIGS. 6 and 8A, an emission 1st lens row 11U11 that is the first row in the first emission lens group 11UL1 has the lens vertices TLb (see FIG. 3) set to emit light in the central third range 3Ea in the first illumination region E1. That is, the emission 1st lens row 11U11 has the lens vertices TLb set so that light from an odd numbered first emission lens 11b1d and light from an even numbered first emission lens 11b1a both illuminate the same third range 3Ea in the first illumination region E1. The odd numbered first emission lens 11b1 is denoted by the reference character "11b1d" with a suffix "d", and the even numbered first emission lens 11b1 is denoted by "11b1a" with a suffix "a".

The emission 2nd lens row 11U12 that is the second row in the first emission lens group 11UL1 has the lens vertices TLb set to emit light from the odd numbered first emission lens 11b1d in the second range 2Ea in the first illumination region E1, and to emit light from the even numbered first emission lens 11b1a in the fourth range 4Ea in the first illumination region E1.

The emission 3rd lens row 11U13 that is the third row in the first emission lens group 11UL1 has the lens vertices TLb set to emit light from the odd numbered first emission lens 11b1d in the fifth range 5Ea in the first illumination region E1, and to emit light from the even numbered first emission lens 11b1a in the first range 1Ea in the first illumination region E1.

In this manner, with the first emission lens group 11UL1, the first illumination region E1 is set as the total of the illumination ranges that are different for each lens row and overlapped on one another in the central region in the first illumination region E1. Accordingly, in the whole first illumination region E1, the light illumination intensity distribution is higher at the center and is lower at the periphery. The illumination ranges in the first illumination region E1 may be different between an odd numbered lens and an even numbered lens belonging to the same lens row in the first emission lens group 11UL1. Alternatively, the lens vertices TLb may be set for each lens row, that is, the illumination range in the first illumination region E1 may be the same between an odd numbered lens and an even numbered lens belonging to the same lens row. Thus, with the first emission lens group 11UL1, the light illumination intensity distribution of the illumination region is set easier. The first emission lenses 11b1 that are quadrangular convex lenses are all the same in the horizontal lens width and the vertical lens width in the first emission lens group 11UL1, with the lens vertices TLb eccentrically positioned, thereby illuminating different regions in the first illumination region E1 depending on the directions in which light is emitted. As for the second illumination region E2, similar to the above-described first illumination region E1, the illumination region is formed by a plurality of ranges illuminated by light from the lenses arranged in rows. Details thereof will be given later.

As shown in FIGS. 6, 7, 10A, and 10B, in the fly-eye lens 10, the first emission lens group 11UL1 is formed at each of two locations so as to have symmetry with reference to the lens surface center CL. Thus, the fly-eye lens 10 forms the first illumination region E1 (1EA) by light beams from the first emission lens groups 11UL1 of these two locations. As shown in FIG. 9B, in the fly-eye lens 10, the lens vertices TLb are set so that the lenses nearer to the lens surface center CL (see FIG. 10A) provide a wider illumination region width in the horizontal direction. Because each first emission lens group 11UL1 illuminating the first illumination region E1 is the farthest from the lens surface center CL, the first emission lens group 11UL1 has the lens vertices TLb set so that corresponding illumination region width is the nearest to the region center HCL.

Second Emission Lenses

Next, the second emission lenses 11bB are configured to receive light from the second incident lenses 11aA and emit the light in the first range 1Eb to the second range 2Eb in the second illumination region E2. Each of the second emission lenses 11bB is a quadrangular convex lens that is the same as the first emission lens 11b1 in the horizontal lens width and smaller than the first emission lens 11b1 in the vertical lens width. Preferably, the vertical lens width of the second emission lens 11bB is 50% or less as great as the vertical lens width of the first emission lens 11b1. By virtue of the second emission lenses 11bB having the vertical lens width that is 50% or less as great as that of the first emission lenses 11b1, numerous small illumination ranges can be set in the entire illumination region. This improves flexibility in setting the light distribution in the illumination region. The second emission lenses 11bB of substantially the same vertical lens width are aligned as lens groups so as to have horizontal symmetry with reference to the lens surface center CL of the emission lens assemblage 11B. The second emission lenses 11bB have the lens vertices TLb set to illuminate different regions in the second illumination region E2 with the same vertical lens width and different light emitting directions.

As an example, the second emission lenses 11bB have the lens vertices TLb set to oppose to the second incident lenses 11aA and emit light separately in two ranges, and provided with the same vertical lens width in order to receive light condensed by the second incident lenses 11aA. In the present embodiment, the second emission lenses 11bB include emission 1st lenses 11b2 and emission 2nd lenses 11b3. The second emission lenses 11bB are aligned in the horizontal direction to form rows. The emission 1st lenses 11b2 and the emission 2nd lenses 11b3 are each formed as a group of a preset number of lens rows across the vertical direction. The group of the emission 1st lenses 11b2 and the group of the emission 2nd lenses 11b3 form the second emission lens group 11ULB. That is, the second emission lens group 11ULB includes an emission 1st lens group 11UL2 and an emission 2nd lens group 11UL3. Accordingly, the second emission lens group 11ULB is formed of the groups of the second emission lenses 11bB the same as each other in the vertical lens width and emitting light of different illumination region widths.

Emission 1st Lenses

In the following, with reference to FIGS. 1 to 11, a description will be given of the configuration of the emission 1st lenses 11b2 and the emission 2nd lenses 11b3.

As shown in FIGS. 1 to 7, the emission 1st lenses 11b2 are optically opposed to the incident 1st lenses 11a2 of the second incident lenses 11aA, and positioned and designed to have a size to receive light from the incident 1st lenses 11a2. The emission 1st lenses 11b2 have the lens vertices TLb eccentrically positioned so as to emit the received light in the first range 1Eb of the second illumination region E2. The emission 1st lenses 11b2 are smaller in the vertical lens width than the first emission lenses 11b1, and equivalent in the vertical lens width to the emission 2nd lenses 11b3. In the present embodiment, the emission 1st lenses 11b2 are the same in size and aligned in four rows, to form an emission 1st lens row 11U21 to an emission 4th lens row 11U24. The emission 1st lens row 11U21 to the emission 4th lens row 11U24 form the emission 1st lens group 11UL2 in which all the emission 1st lenses 11b2 in the four rows have the same size.

The emission 1st lenses 11b2 are aligned respectively continuously to the upper and lower first emission lens groups 11UL1 of the first emission lenses 11b1. That is, the emission 1st lenses 11b2 are formed as the emission 1st lens group 11UL2 including the emission 1st lens row 11U21 to the emission 4th lens row 11U24 continuously to the first emission lens groups 11UL1. The emission 1st lens group 11UL2 is formed at each of two locations, that is, one from the higher level to the lower level in the emission lens assemblage 11B, and other from the lower level to the higher level in the emission lens assemblage 11B. In the present embodiment, the emission 1st lens groups 11UL2 are formed to be continuous to the first emission lens groups 11UL1 so as to have horizontal symmetry with reference to the lens surface center CL. As used herein, the term horizontal symmetry refers to the disposition of the emission 1st lenses 11b2. Accordingly, while the shape of the lens vertices TLb may not have horizontal symmetry, the lens shape may also have horizontal symmetry. The usage of the term horizontal symmetry holds true for other lenses.

Emission 1st Lenses and Second Illumination Region

The emission 1st lenses 11b2 emit light in the first range 1Eb of the second illumination region E2. The emission 1st lenses 11b2 are formed to emit light from the lens rows divisionally in the first range 1Eb. The emission 1st lenses 11b2 have the lens vertices TLb eccentrically positioned so that the whole first range 1Eb is illuminated by ranges of light emitted from preset one or more lenses. Note that, the first range 1Eb is formed by a maximum range where light beams from two adjacent emission 1st lenses 11b2 in each lens row are overlapped. The light illumination intensity distribution of the maximum range is set by light beams emitted from all the emission 1st lenses 11b2 of the emission lens group 11UL2. In the following, with reference to FIG. 8B, a description will be given of the first range 1Eb.

Figure 8B:
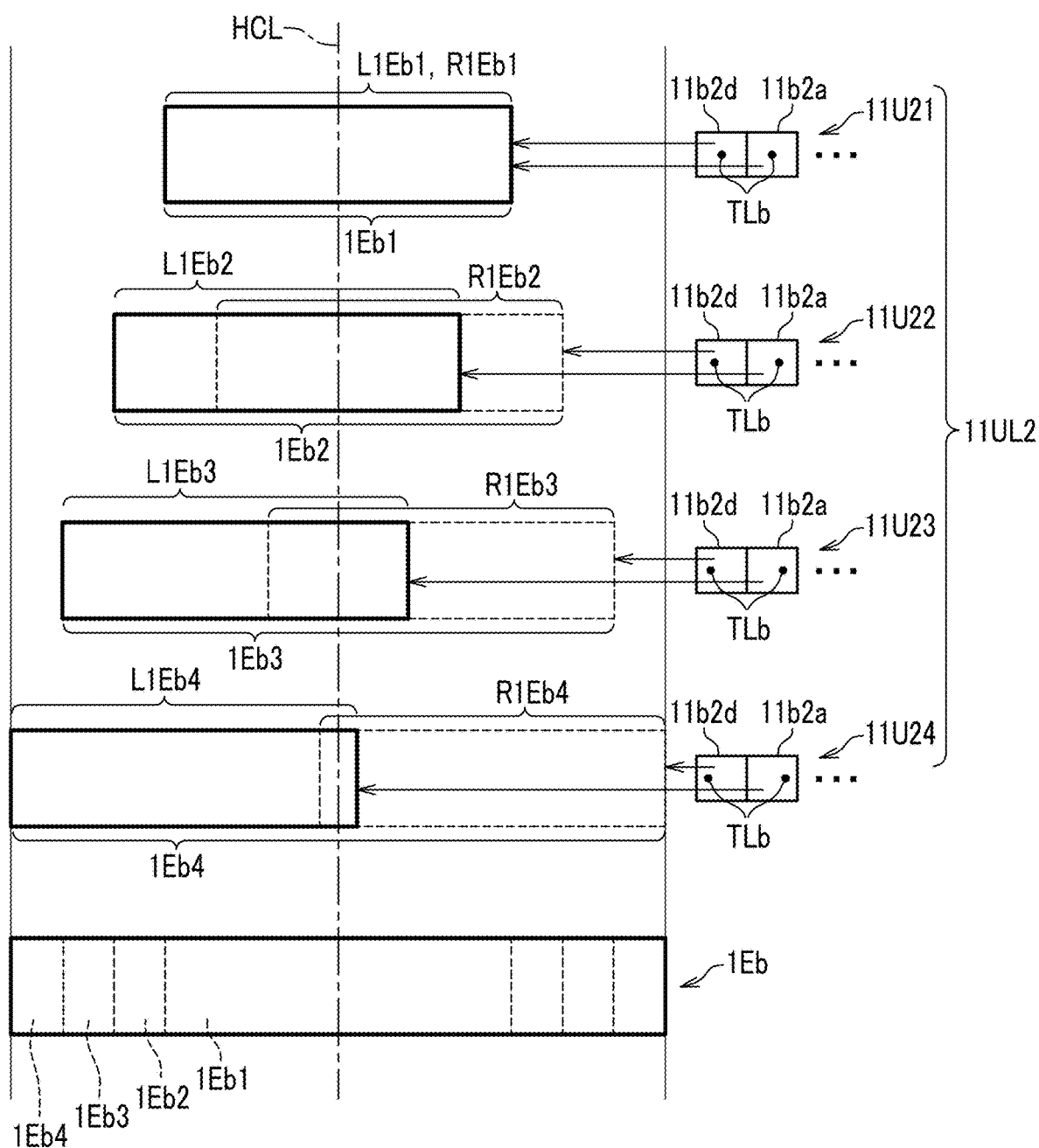
FIG. 8B is an explanatory illustration for describing the relationship, in the second emission lenses of the fly-eye lens according to the first embodiment, between emission 1st lens rows and a first range of the second illumination region.

As shown in FIG. 8B, the illumination range and the light illumination intensity distribution of the whole first range 1Eb is set by the group (total) of individual ranges of light beams emitted from the emission 1st lens row 11U21 to the emission 4th lens row 11U24 of the emission 1st lenses 11b2. The individual illuminated ranges are set to have vertical symmetry with reference to the region center HCL in the width direction (the X-direction) of the first range 1Eb. The first range 1Eb includes, as the individual illuminated ranges, a first section 1Eb1, a second section 1Eb2, a third section 1Eb3, and a fourth section 1Eb4. That is, the four sections of the first range 1Eb are respectively set by the four lens rows. The emission 1st lens row 11U21 to the emission 4th lens row 11U24 have the lens vertices TLb of the emission 1st lenses 11b2 set so as to respectively emit light beams in the first section 1Eb1 to the fourth section 1Eb4 of the first range 1Eb. Note that, the first section 1Eb1 to the fourth section 1Eb4 of the first range 1Eb are set to include the region center HCL, thereby overlapped on each other by certain regions forming the center. As an example, each of the second section 1Eb2 to the fourth section 1Eb4 is formed as a group (total) of two subsections. In the following description, the odd numbered emission 1st lens 11b2 is denoted by the reference character "11b2d" with a suffix "d", and the even numbered emission 1st lens 11b2 is denoted by "11b2a" with a suffix "a".

The emission 1st lens row 11U21 of the emission 1st lenses 11b2 has the lens vertices TLb of the emission 1st lenses 11b2 eccentrically set so that, for example, the odd numbered and even numbered emission 1st lenses 11b2d, 11b2a emit light in the first section 1Eb1. The first section 1Eb1 is a quadrangle of which horizontal width and vertical width are set by the horizontal lens width and the vertical lens width of the incident 1st lenses 11a2. In the present embodiment, the emission 1st lenses 11b2 mainly function to control the light emitting direction.

Next, the emission 2nd lens row 11U22 of the emission 1st lenses 11b2 has the lens vertices TLb eccentrically set so that, for example, the odd numbered emission 1st lens 11b2d in the row emits light in one subsection R1Eb2 of the second section 1Eb2. The emission 2nd lens row 11U22 of the emission 1st lenses 11b2 has the lens vertices TLb set so that the even numbered emission 1st lens 11b2a in the row emits light in other subsection L1Eb2 of the second section 1Eb2. That is, the second section 1Eb2 is formed by one subsection R1Eb2 and other subsection L1Eb2. The one subsection R1Eb2 and other subsection L1Eb2 have vertical symmetry with respect to the region center HCL. The second section 1Eb2 is greater than the first section 1Eb1 in the total illuminated area in the horizontal direction (X-direction), and smaller than the third section 1Eb3 and the fourth section 1Eb4 of the total illuminated area in the horizontal direction.

Next, the emission 3rd lens row 11U23 of the emission 1st lenses 11b2 have the lens vertices TLb eccentrically set so that the odd numbered emission 1st lens 11b2d in the row emits light in one subsection R1Eb3 of the third section 1Eb3, and the even numbered emission 1st lens 11b2a in the row emits light in other subsection L1Eb3 of the third section 1Eb3. The one subsection R1Eb3 and the other subsection L1Eb3 of the third section 1Eb3 are set to have vertical symmetry and include the region center HCL, thereby overlapped on each other by certain regions forming the center. The one subsection R1Eb3 and the other subsection L1Eb3 of the third section 1Eb3 form the overlapped central region at the region center HCL that is smaller than the overlapped central region formed by the one subsection R1Eb2 and the other subsection L1Eb2 of the second section 1Eb2. That is, the third section 1Eb3 extends farther than the second section 1Eb2 from the region center HCL in the horizontal direction, and greater in the illuminated area.

Next, the emission 4th lens row 11U24 of the emission 1st lenses 11b2 has the lens vertices TLb set so that the odd numbered emission 1st lens 11b2d in the row emits light in one subsection R1Eb4 of the fourth section 1Eb4, and the even numbered emission 1st lens 11b2a in the row emits light in other subsection L1Eb4 of the fourth section 1Eb4. The one subsection R1Eb4 and the other subsection L1Eb4 of the fourth section 1Eb4 are set to have vertical symmetry and include the region center HCL, thereby overlapped on each other by certain regions forming the center. The one subsection R1Eb4 and the other subsection L1Eb4 of the fourth section 1Eb4 form the overlapped central region at the region center HCL that is smaller than the overlapped central region formed by the one subsection R1Eb3 and the other subsection L1Eb3 of the third section 1Eb3. That is, the fourth section 1Eb4 is formed to be greater than the third section 1Eb3 in the illuminated area in the horizontal direction. The fourth section 1Eb4 is set to be equivalent to the first range 1Eb.

The group (total illumination area) of the first section 1Eb1 to the fourth section 1Eb4 forms the first range 1Eb and sets the light illumination intensity distribution. In the first range 1Eb, the light illumination intensity distribution is set to be higher around the region center HCL and lower toward the periphery. Note that, in the present embodiment, the first section 1Eb1, the one subsection of each of the second section 1Eb2 to the fourth section 1Eb4, and the other subsection of each of the second section 1Eb2 to the fourth section 1Eb4 are the same as one another in size.

The ranges illuminated with light beams from the emission 1st lens row 11U21 to the emission 4th lens row 11U24 of the emission 1st lenses 11b2 gradually widen in the opposite sides from the region center HCL and increased in the area as the lens rows are nearer to the lens surface center CL.

Figure 10C:
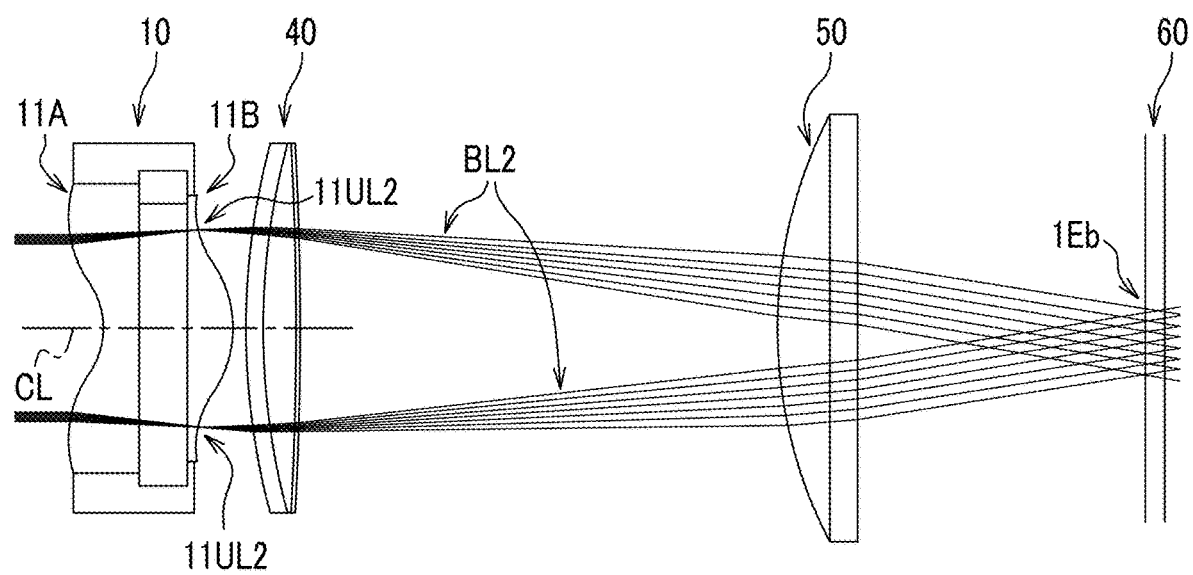
FIG. 10C is an explanatory illustration schematically showing the relationship between light emitted from an emission 1st lens of the second emission lens in the vertical direction of the fly-eye lens according to the first embodiment and a first range of the second illumination region in the light modulation part of the light modulation device.
Figure 10D:
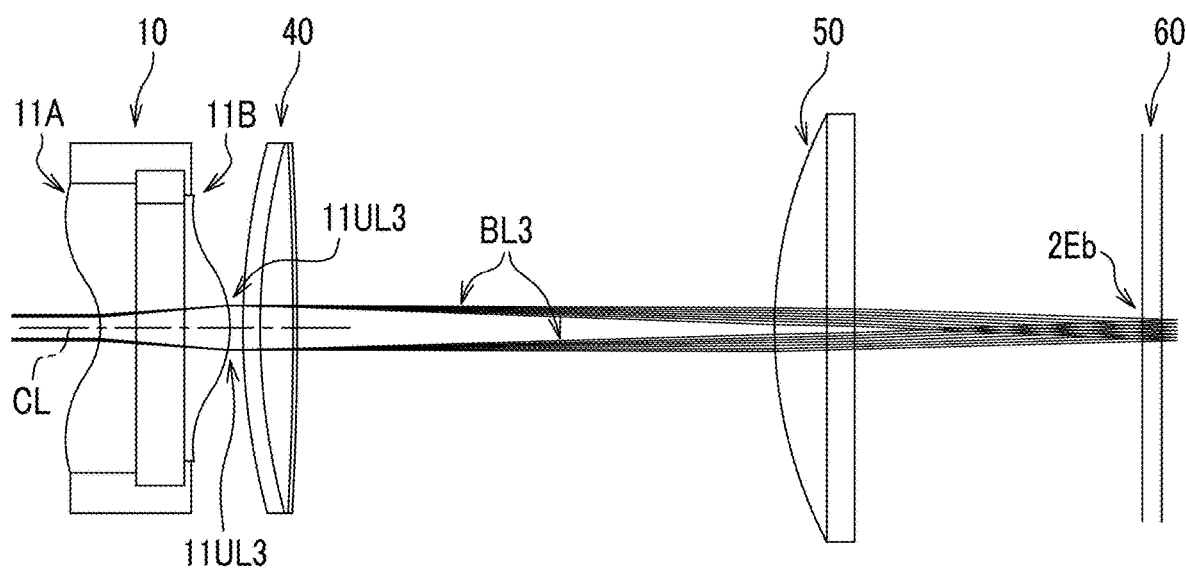
FIG. 10D is an explanatory illustration schematically showing the relationship between light emitted from an emission 2nd lens of the second emission lens in the vertical direction of the fly-eye lens according to the first embodiment and a third range of the second illumination region in the light modulation part of the light modulation device.

As shown in FIGS. 10A and 10C, in the fly-eye lens 10, the emission 1st lens groups 11UL2 of the emission 1st lens 11b2 are formed at two locations in the vertical direction. The light beams emitted from the two locations form the first range 1Eb. As shown in FIG. 8B, in the emission 1st lens group 11UL2 of the fly-eye lens 10, the central portion of the first range 1Eb is overlapped on the central portion of the first illumination region E1, and right and left ends thereof extend outward of the first illumination region E1.

Emission 2nd Lenses

As to the emission 2nd lenses 11b3 described in the following also, the second range 2Eb is formed of sections in the number corresponding to the lens rows, and each of the second and subsequent sections is formed of two subsections. As the lens rows are nearer to the lens surface center CL, the two subsections increasingly extend toward the opposite sides with reference to the region center HCL. Therefore, while the reference characters are different, the foregoing description holds true for the emission 2nd lenses 11b3. Hence, in the description of the emission 2nd lenses 11b3, the above-described sections and subsections forming the ranges will be referred to and details thereof will not be repeated.

Next, as shown in FIGS. 1 to 7, the emission 2nd lenses 11b3 are optically opposed to the incident 2nd lenses 11a3 of the second incident lenses 11aA. The emission 2nd lenses 11b3 are positioned and provided with the size configured to receive light from the incident 2nd lenses 11a3. The emission 2nd lenses 11b3 have the lens vertices TLb eccentrically positioned so as to emit the received light in the second range 2Eb of the second illumination region E2. The emission 2nd lenses 11b3 are equivalent in the vertical lens width to the emission 1st lenses 11b2. The emission 2nd lenses 11b3 are the same in size and aligned in six rows, to form an emission 1st lens row 11U31 to an emission 6th lens row 11U36.

The emission 1st lens row 11U31 to the emission 6th lens row 11U36 form the emission 2nd lens group 11UL3 in which all the emission 2nd lenses 11b3 of the six rows have the same size. The emission 2nd lenses 11b3 are aligned respectively continuous to the upper and lower emission 1st lens groups 11UL2 of the emission 1st lenses 11b2. That is, the emission 2nd lens 11b3 are formed as the emission 2nd lens group 11UL3 including the emission 1st lens row 11U31 to the emission 6th lens row 11U36 continuously to the emission 1st lens groups 11UL2. The emission 2nd lens group 11UL3 is formed at each of two locations, that is, one from the higher level to the lower level in the emission lens assemblage 11B, and other from the lower level to the higher level in the emission lens assemblage 11B. In the present embodiment, the emission 2nd lens groups 11UL3 are formed to be continuous to the emission 1st lens groups 11UL2 so as to have horizontal symmetry with reference to the lens surface center CL. Thus, two emission 2nd lens groups 11UL3, 11UL3 are continuously formed with reference to the lens surface center CL.

The emission 2nd lenses 11b3 emit light in the second range 2Eb of the second illumination region E2. The emission 2nd lenses 11b3 have the lens vertices TLb eccentrically positioned so that the emission 1st lens row 11U31 to the emission 6th lens row 11U36 emit light beams in the sections and subsections within the second range 2Eb. That is, the emission 2nd lenses 11b3 have the lens vertices TLb eccentrically positioned so that the second range 2Eb is set by the group (total) of ranges of light beams emitted from the preset lens rows.

Figure 8C:
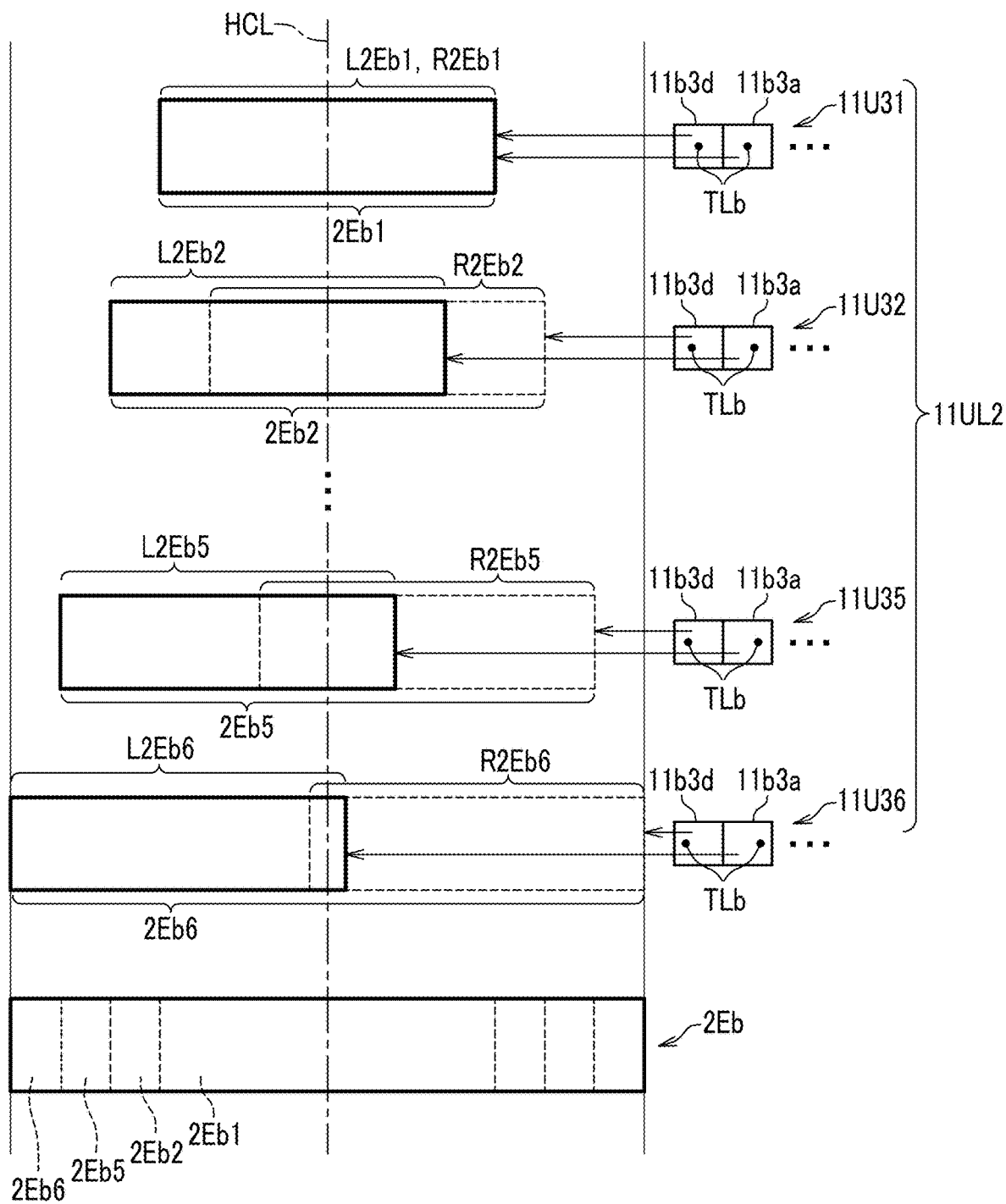
FIG. 8C is an explanatory illustration for describing the relationship, in the second emission lens of the fly-eye lens according to the first embodiment, between emission 2nd lens rows and a second range of the second illumination region.

Illumination Region by Emission 2nd Lenses, First Section to Fourth Section of Second Range As shown in FIG. 8C, the second range 2Eb is set by a group of: sections formed by the emission 1st lens row 11U31 that is the first row in the lens group; and sections and subsections each obtained by dividing one section formed by the emission 2nd lens row 11U32 to the emission 6th lens row 11U36 that is the last lens row. The second range 2Eb has its section or subsection disposed to have vertical symmetry with reference to the region center HCL. The emission 1st lens row 11U31 to the emission 6th lens row 11U36 are designed so that, as the rows are nearer to the lens surface center CL, the sections forming the second range 2Eb are positioned increasingly outward with reference to the region center HCL. The emission 2nd lenses 11b3 emit light in the second range 2Eb that is smaller than the first range 1Eb in the vertical direction and extends outward of the first range 1Eb with reference to the region center HCL. While the second range 2Eb corresponding to the emission 2nd lenses 11b3 is different from the already described first range 1Eb corresponding to the emission 1st lenses 11b2 in the positional relationship and size, the difference from the first section 1Eb1 to the fourth section 1Eb4 of the first range 1Eb just lies in the number of the sections and reference characters, and the second range 2Eb is similarly formed of regions including sections and subsections. Therefore, the description thereof will not be repeated.

Further, as shown in FIGS. 6 and 7 (see FIG. 10A), in the fly-eye lens 10, the emission 2nd lens group 11UL3 is formed at each of two locations so as to have horizontal symmetry with reference to the lens surface center CL. Thus, the second range 2Eb is formed by light beams emitted from the two locations. As shown in FIGS. 9C and 9D, in the fly-eye lens 10, the second range 2Eb are formed to spread outward of the first range 1Eb with reference to the region center HCL. In the present embodiment, as compared to the emission 1st lens group 11UL2 emitting light in the first range 1Eb, the emission 2nd lens group 11UL3 is nearer to the lens surface center CL. Therefore, the second range 2Eb is overlapped at its center on the first illumination region E1 and becomes wider toward the opposite ends in the horizontal direction from the region center HCL.

Illumination Region

Figure 9A:
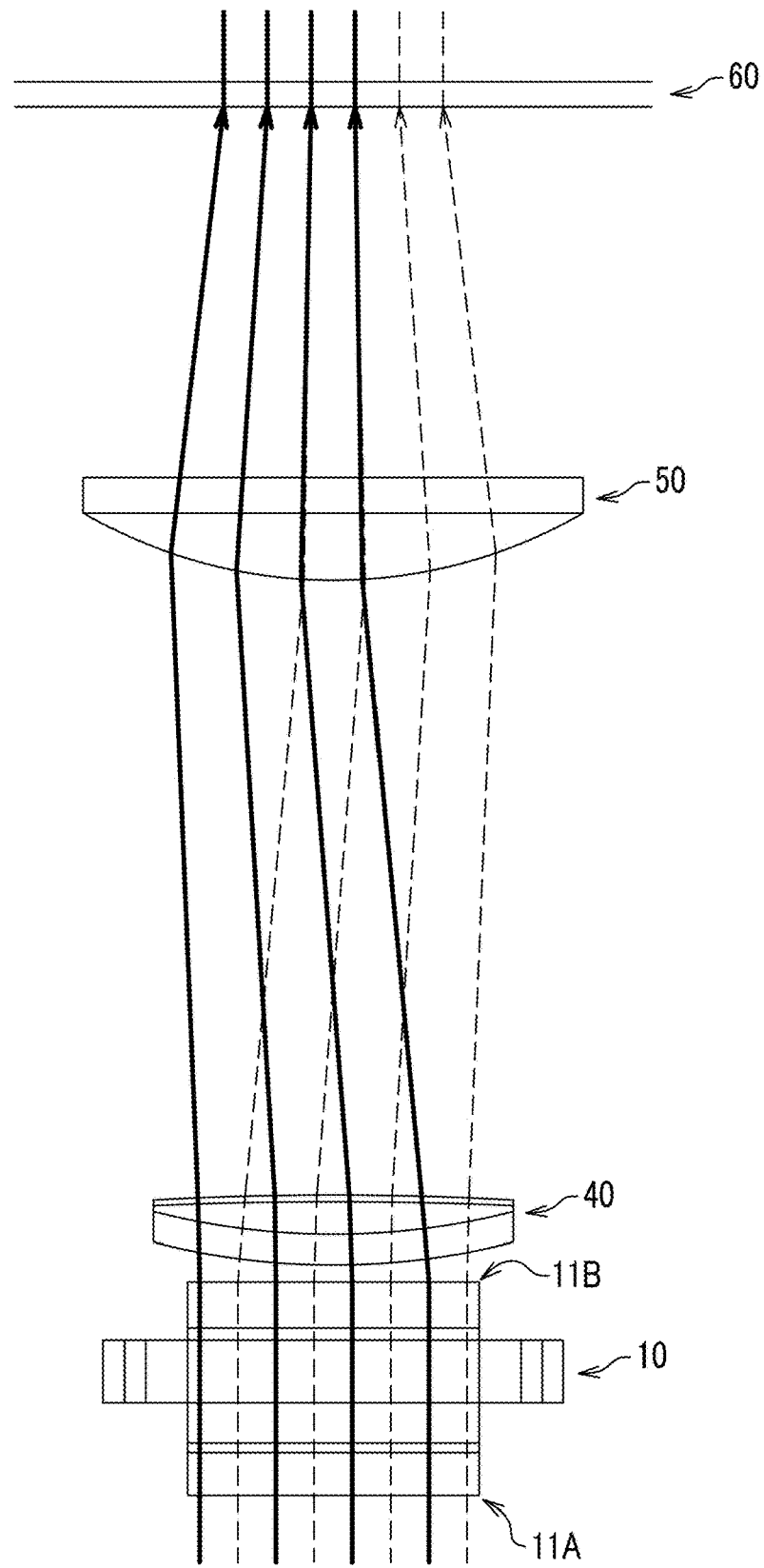
FIG. 9A is an explanatory illustration schematically showing the relationship between light emitted in the horizontal direction of the fly-eye lens according to the first embodiment and the illumination region.
Figure 9B:
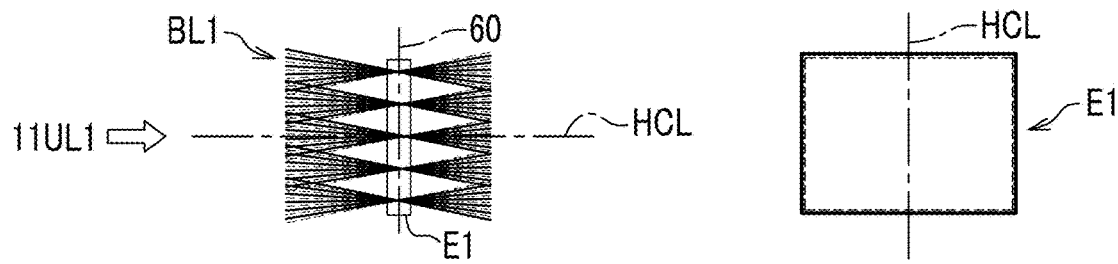
FIG. 9B is an explanatory illustration for describing the relationship between light emitted from a first emission lens group of the fly-eye lens according to the first embodiment and an illumination position in the horizontal direction of the light modulation part of the light modulation device.
Figure 9C:
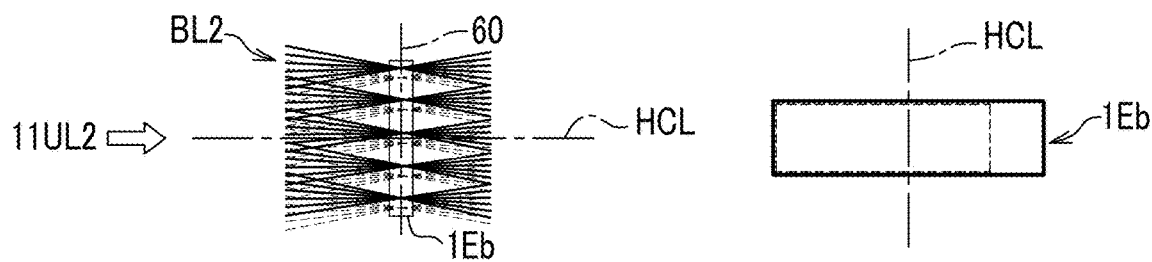
FIG. 9C is an explanatory illustration for describing the relationship between light emitted from an emission 1st lens group of a second emission lens group in the fly-eye lens according to the first embodiment and an illumination position in the horizontal direction of the light modulation part of the light modulation device.
Figure 9D:
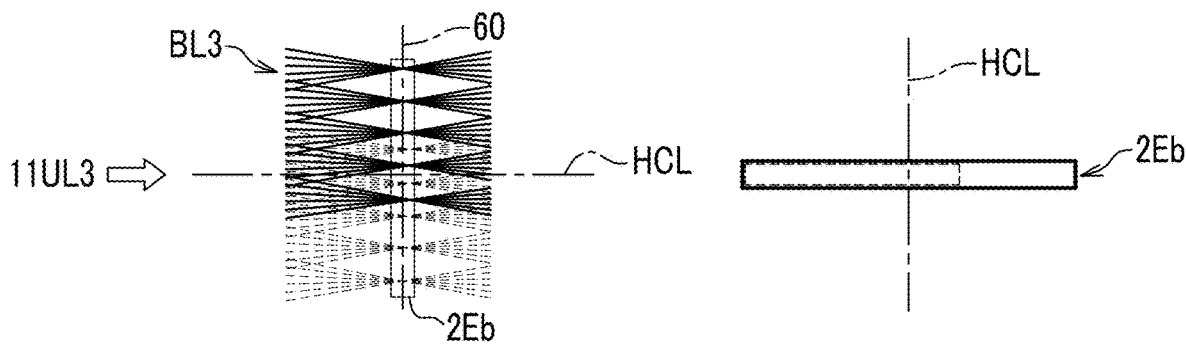
FIG. 9D is an explanatory illustration for describing the relationship between light emitted from an emission 2nd lens group of the second emission lens group in the fly-eye lens according to the first embodiment and an illumination position in the horizontal direction of the light modulation part of the light modulation device.

As has been described, as shown in FIGS. 9A and 10A, when light becomes incident on the incident lens assemblage 11A as collimated light beams, the fly-eye lens 10 formed of the incident lenses 11a and the emission lenses 11b emits the light beams from the emission lens assemblage 11B in the first illumination region E1 and the second illumination region E2. The fly-eye lens 10 emits light so as to attain a preset light illumination intensity distribution in the first illumination region E1 of the illumination region EA, and a preset light illumination intensity distribution in the second illumination region E2 of the illumination region EA. The fly-eye lens 10 emits light so that central partial portion of the first range 1Eb and the second range 2Eb of the second illumination region E2 is overlapped on the first illumination region E1 while having vertical symmetry relative to the first illumination region E1. Accordingly, in the illumination region EA, a desired gray scale distribution is attained, that is, the light illumination intensity distribution in the whole illumination region is higher at the center and lower toward the periphery of the illumination region EA. In the illumination region EA, setting the first illumination region E1 and the second illumination region E2 sets all the ranges in the illuminated region. That is, by setting the illuminated region in the illumination region EA to be 70% as great as the illumination region EA, the defined light illumination intensity distribution of the entire region is secured. It goes without saying that the illumination region EA may be set by light emission in the whole region by the first illumination region E1 and the second illumination region E2, or the first illumination region E1 or the second illumination region E2.

As shown in FIGS. 10A to 10D, the first illumination region E1 and the second illumination region E2 are formed by a group of illumination ranges illuminated with light beams BL1 to BL6 of the first emission lens group 11UL1 or lens groups of the second emission lenses 11bB. The first illumination region E1 is set at the central region in the rectangular illumination region EA, and illuminated with light from the first emission lens group 11UL1 disposed at each of two upper and lower locations in the fly-eye lens 10. Similarly, the second illumination region E2 is formed by a group of illumination ranges illuminated with light beams from the lens groups. The second illumination region E2 is illuminated with light from the lens groups respectively disposed at two upper and lower locations in the fly-eye lens 10, so as to be partially overlapped on the central region in the rectangular illumination region EA. For example, as shown in FIGS. 8B and 8C, the first range 1Eb and the second range 2Eb are divided into the first section 1Eb1 to the fourth section 1Eb4, or the first section 2Eb to the sixth section 2Eb6. Each of the sections are further divided into one subsection and other subsection. Therefore, with light emitted from the emission 1st lens group 11UL2 of the second emission lenses 11bB, a light illumination intensity distribution of the whole illumination region can be set to be higher around the region center HCL and lower toward the periphery. Similarly to the first illumination region 1E, the second range 2Eb of the second illumination region E2 can be set to have a light illumination intensity distribution of the whole illumination region that is higher around the region center HCL and lower toward the periphery.

Accordingly, in the fly-eye lens 10, with the first illumination region E1 and the second illumination region E2, the light illumination intensity distribution of the whole illumination region is easily set to be higher around the region center HCL and lower toward the periphery. By the vertical range of first range 1Eb and the second range 2Eb of the second illumination region E2 being set 50% or less as great as the vertical range of the first illumination region E1, the light illumination intensity distribution in the illumination region EA is easily adjusted and setting flexibility improves.

In the fly-eye lens 10, the lens groups and the lens rows are arranged to have vertical symmetry with reference to the lens surface center CL. The emission 1st lenses 11b2 and the emission 2nd lenses 11b3 of the first emission lenses 11b1 to the second emission lenses 11bB are equivalent in the horizontal lens width and the vertical lens width with reference to the lens surface center CL. This makes it easier to align and connect the lenses in forming the fly-eye lens 10.

In the fly-eye lens 10, at least one lens group of the second incident lens groups 11NLA aligned in the vertical direction is different in the number of lens rows from other lens groups. At least one lens group of the second emission lens groups 11ULB aligned in the vertical direction is different in the number of lens rows from other lens groups. In the fly-eye lens 10, the second incident lens group 11NLA and the second emission lens group 11ULB in different number of lens rows are optically opposed to each other, with the difference in the lens rows being the same between them.

That is, in the fly-eye lens 10, the number of lens rows in the incident 1st lens group 11NL2 and the incident 2nd lens group 11NL3 of the second incident lens group 11NLA is four or six, which is the difference in the number of lens rows in one lens group. In the fly-eye lens 10, the number of lens rows in the emission 1st lens group 11UL2 and the emission 2nd lens group 11UL3 of the second emission lens group 11ULB is four or six, which is the difference in the number of lens rows in one group. In the fly-eye lens 10, the difference in the number of lens rows between the lens groups is the same between the incident side and the emission side.

In this manner, the lens rows in the lens groups are set as desired in the fly-eye lens 10 and, therefore, the illumination region EA is set as desired.

First Range of Illumination Region: First Section to Fourth Section of First Range The ranges illuminated with light from the lens rows of the fly-eye lens 10 may be set as shown in FIGS. 11, 12A to 12C, for example.

Figure 11:
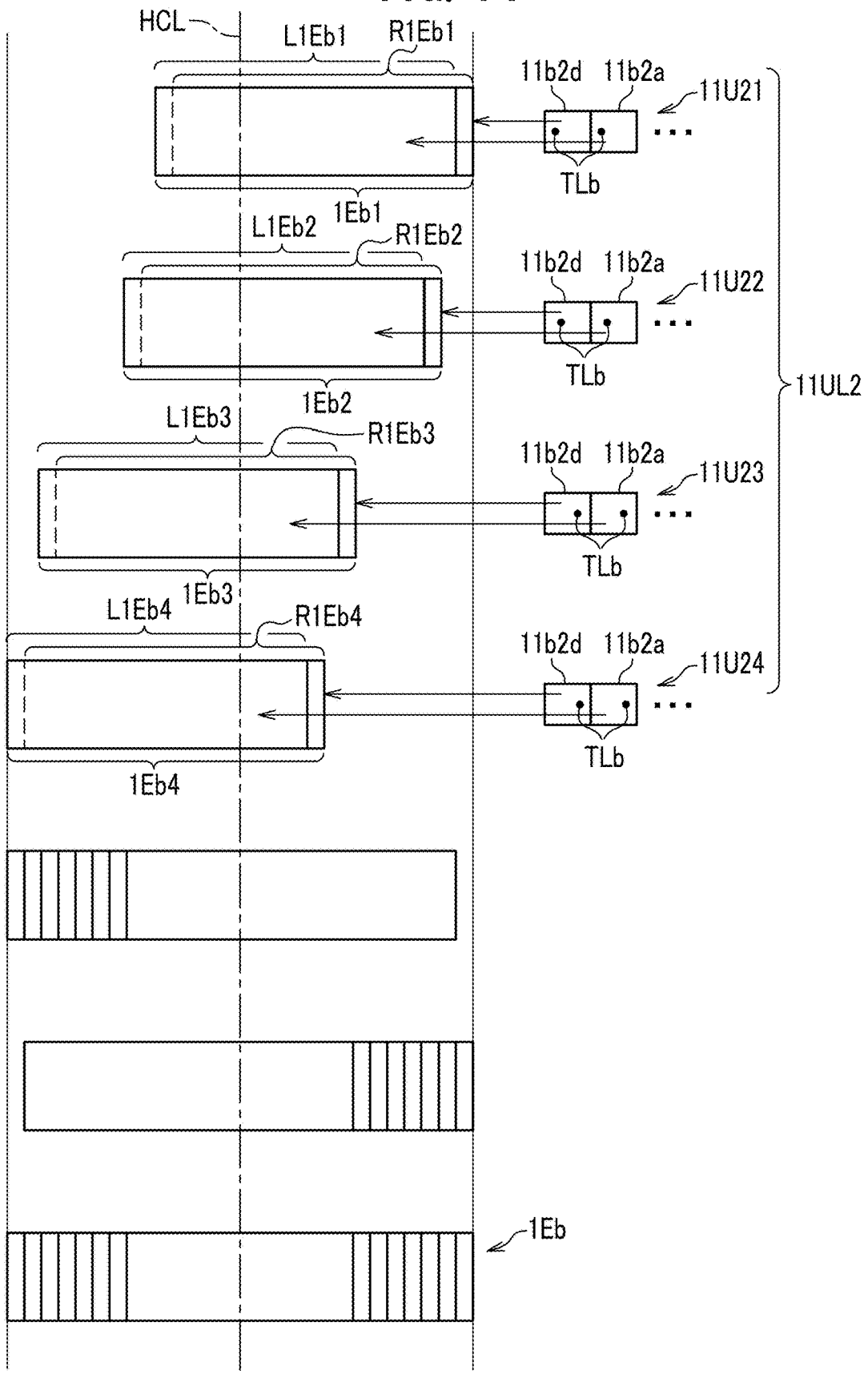
FIG. 11 is an explanatory illustration for describing the relationship between emission 1st lens rows in a second emission lens of a fly-eye lens according to a variation and a first range of a second illumination region.

With reference to FIG. 11, a description will be given of the emission 1st lenses 11b2 of the second emission lenses 11bB representing the lens rows of the emission 1st lenses 11b2 and the emission 2nd lenses 11b3 of the first emission lenses 11b1 and the second emission lenses 11bB.

As shown in FIG. 11, the emission 1st lens row 11U21 of the emission 1st lens group 11UL2 has the lens vertices TLb positioned so that one subsection R1Eb1 in the first section 1Eb1 forming the first range 1Eb is illuminated with light from the odd numbered emission 1st lens 11b2d. The emission 1st lens row 11U21 has the lens vertices TLb positioned so that other subsection L1Eb1 in the first section 1Eb1 forming the first range 1Eb is illuminated with light from the even numbered emission 1st lenses 11b2a. The first section 1Eb1 is set to the right end range in the first range 1Eb. The first section 1Eb1 is partially overlapped on the region center HCL, and formed by the one subsection R1Eb1 and the other subsection L1Eb1.

The emission 2nd lens row 11U22 of the emission 1st lens group 11UL2 has the lens vertices TLb positioned so that one subsection R1Eb2 in the second section 1Eb2 forming the first range 1Eb is illuminated with light from the emission 1st lens 11b2a of the odd numbered emission 1st lens 11b2d. The emission 2nd lens row 11U22 has lens vertices TLb positioned so that other subsection L1Eb2 in the second section 1Eb2 forming the first range 1Eb is illuminated with light from the even numbered emission 1st lens 11b2a. The second section 1Eb2 is formed by the one subsection R1Eb2 and the other subsection L1Eb2. The second section 1Eb2 is disposed toward the region center HCL than the first section 1Eb1 is and rightward than the third section 1Eb3, to be partially overlapped on the region center.

The emission 3rd lens row 11U23 of the emission 1st lens group 11UL2 has the lens vertices TLb positioned so that one subsection R1Eb3 in the third section 1Eb3 forming the first range 1Eb is illuminated with light from the odd numbered emission 1st lens 11b2d. The emission 3rd lens row 11U23 has the lens vertices TLb positioned so that other subsection L1Eb3 in the third section 1Eb3 forming the first range 1Eb is illuminated with light from the even numbered emission 1st lens 11b2a. The third section 1Eb3 is formed by the one subsection R1Eb3 and the other subsection L1Eb3. The third section 1Eb3 and the second section 1Eb2 have vertical symmetry with respect to and the region center HCL. The third section 1Eb3 is partially overlapped on the region center HCL.

The emission 4th lens row 11U24 of the emission 1st lens group 11UL2 has the lens vertices TLb positioned so that one subsection R1Eb4 in the fourth section 1Eb4 forming the first range 1Eb is illuminated with light from the odd numbered emission 1st lens 11b2d. The emission 4th lens row 11U24 has the lens vertices TLb positioned so that other subsection L1Eb4 in the fourth section 1Eb4 forming the first range 1Eb is illuminated with light from the even numbered emission 1st lens 11b2a. The fourth section 1Eb4 is formed by the one subsection R1Eb4 and the other subsection L1Eb4. The fourth section 1Eb4 and the first section 1Eb1 have vertical symmetry with respect to the region center HCL. The fourth section 1Eb4 is partially overlapped on the region center HCL.

In this manner, the first range 1Eb may be formed by a plurality of sections of substantially the same area across its one end to its other end. Each of the sections of the first range 1Eb is formed of two subsections, namely, the one subsection and the other subsection.

In the case in which the number of lens rows forming the lens group is an odd number, the sections should be disposed so that any one of the lens rows has symmetry with respect to the region center HCL, the illumination range of which one lens row is set by a plurality of sections. Thus, the light illumination intensity distribution of the whole illumination range attains vertical symmetry with respect to the region center HCL.

Setting the lens vertices TLb of the lens rows in FIG. 11, the position of the even numbered and odd numbered lens vertices TLb gradually change from one end side toward other end side of the lens rows. The setting may be selectively determined in accordance with the purpose.

The first illumination region E1 may also be set in the manner shown in FIG. 11. The second range 2Eb, which is the other region range in the second illumination region E2, may similarly be set to have a light illumination intensity distribution which is higher at the center and lower toward the opposite sides in the horizontal direction.

Other Illumination Region With Other Lens Row Configuration

Figure 12B:
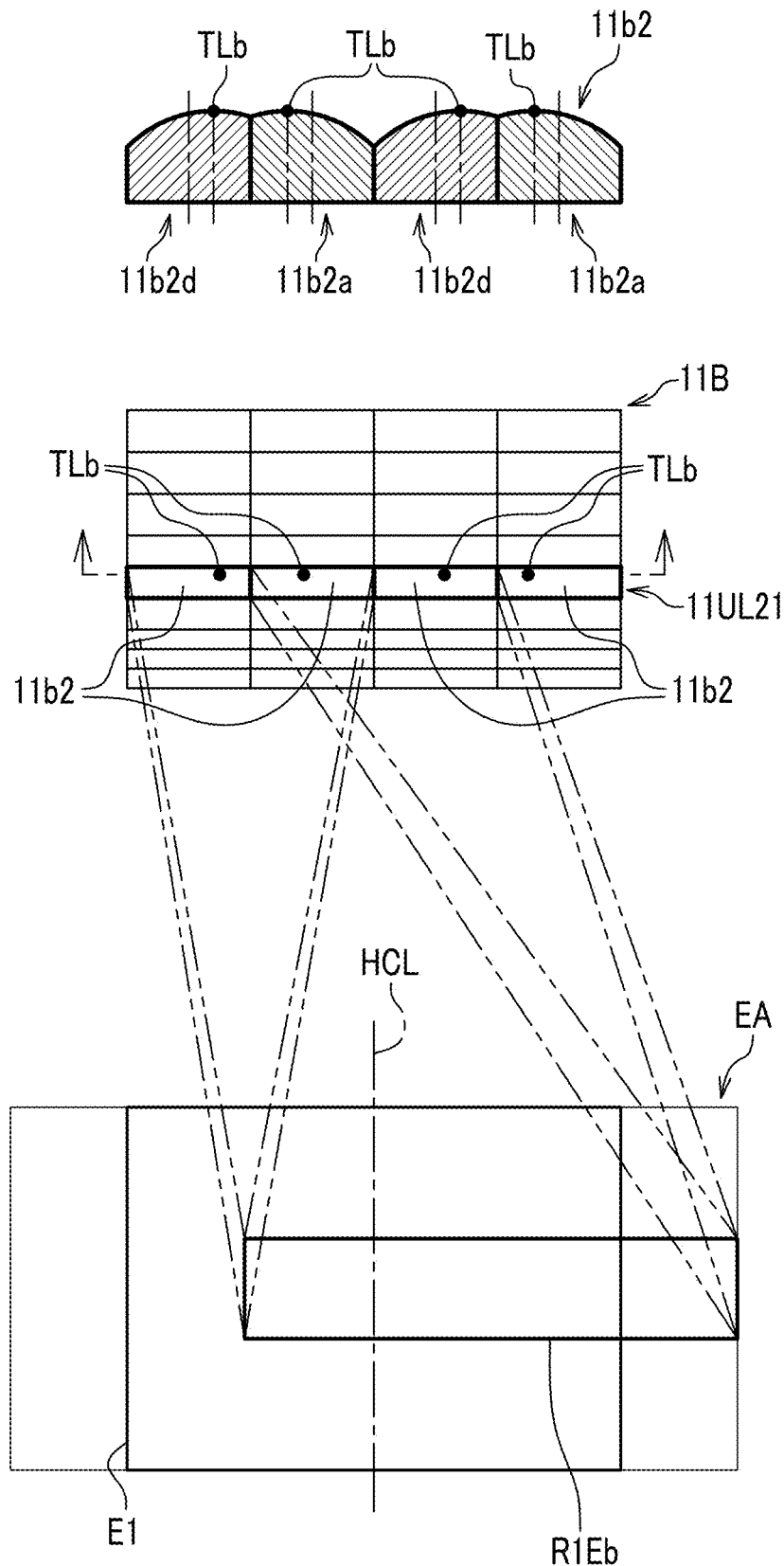
FIG. 12B is an explanatory illustration describing the relationship between light emitted from an odd numbered lens in any lens row in the second emission lens of the fly-eye lens according to other variation and the first range of the second illumination region.
Figure 12C:
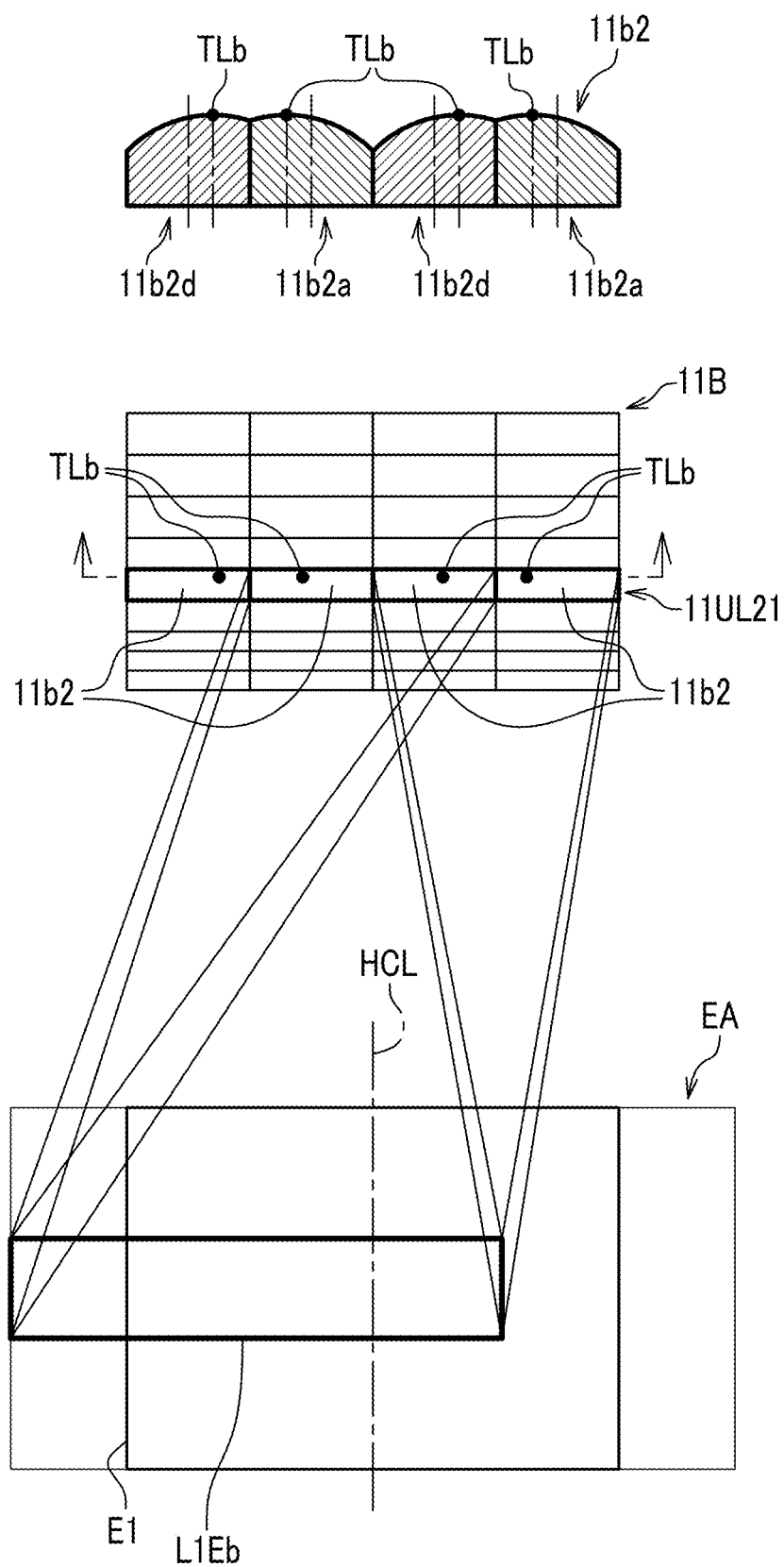
FIG. 12C is an explanatory illustration describing the relationship between light emitted from an even numbered lens in any lens row in the second emission lens of the fly-eye lens according to other variation and the first range of the second illumination region.

Next, the lens row configuration and illumination regions as shown in FIGS. 12A to 12C may be employed. In this configuration, one lens row is set to have an illumination range positioned rightward or leftward with reference to the region center HCL.

With reference to FIGS. 12A to 12C, a description will be given of emission 1st lenses 11b2 of the second emission lenses 11bB representing the lens rows of the emission 1st lenses to the emission 5th lenses of the first emission lenses 11b1 and the second emission lenses 11bB. As an example, each lens row includes four lenses in total. The odd numbered emission 1st lens 11b2 is demoted by the reference character "11b2d" with a suffix "d", and the even numbered emission 1st lens 11b2 is denoted by "11b2a" with a suffix "a".

As shown in FIG. 12A, the emission 1st lens row 11U21 of the emission 1st lens group 11UL2 is set to emit light in a plurality of sections forming the first range 1Eb. In this configuration, the first range 1Eb is set by one section R1Eb and other section L1Eb which have vertical symmetry and are partially overlapped on the region center HCL. The emission 1st lens row 11U21 have the lens vertices TLb positioned so that the one subsection R1Eb is illuminated with light from the odd numbered emission 1st lens 11b2d as shown in FIG. 12B, and the other subsection L1Eb is illuminated with light from the even numbered emission 1st lens 11b2a shown in FIG. 12C. Similarly to the emission 1st lens row 11U21, other lens rows of the emission 1st lens group 11UL2 have the lens vertices TLb positioned so that the one subsection R1Eb is illuminated with light from the odd numbered emission 1st lens 11b2d and the other subsection L1Eb is illuminated with light from the even numbered emission 1st lens 11b2a.

In this manner, in the fly-eye lens, in each lens row in each lens group, the even numbered and odd numbered lens vertices TLb are alternately assigned to the one subsection and the other subsection, to set the illumination region. Thus, each lens group is formed of lenses with smaller variations in the position of the lens vertices TLb. Therefore, in forming the fly-eye lens, variations in the lens surface becomes small.

The first illumination region E1 can also be set as shown in FIGS. 12A to 12C. The second range 2Eb which is the other region range in the second illumination region E2 may similarly be set to have a light illumination intensity distribution that is higher at the center and lower toward the opposite sides in the horizontal direction.

Configuration of Illumination Region as Variation

Figure 13A:
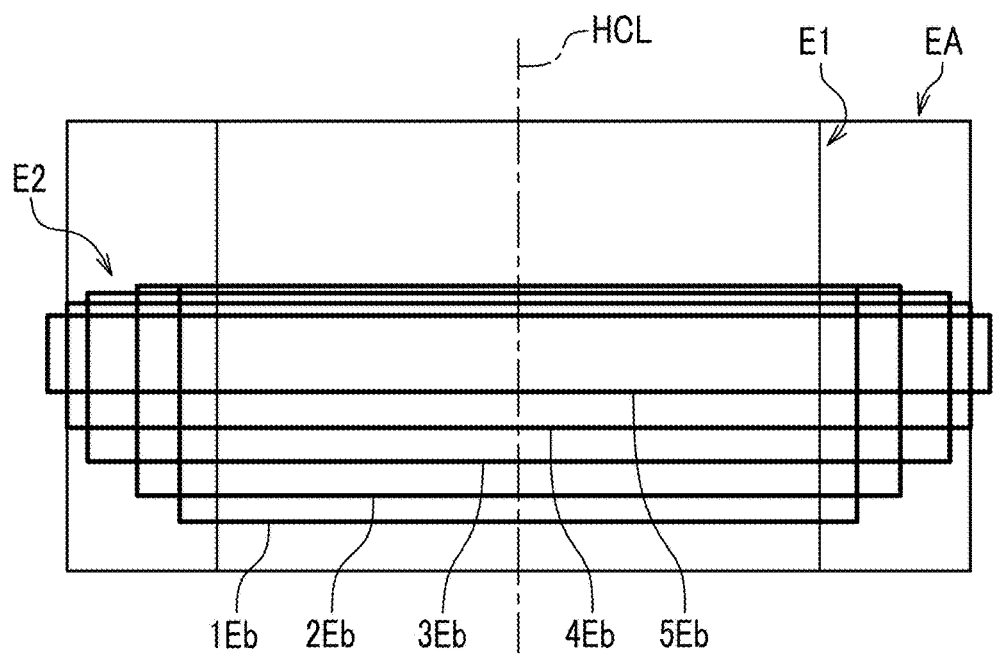
FIG. 13A is an explanatory illustration schematically showing the state of a first illumination region and a second illumination region in an illumination region provided by the fly-eye lens according to other variation illuminating a light modulation part of a light modulation device.
Figure 13B:
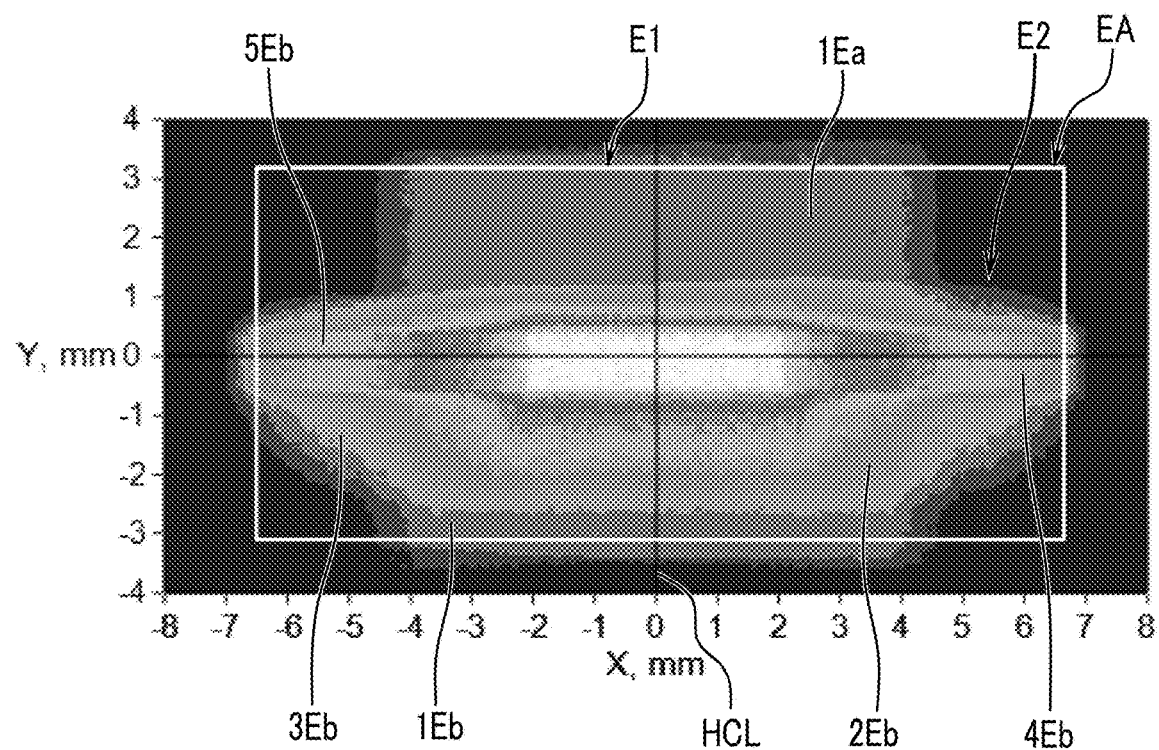
FIG. 13B is an explanatory illustration showing an illumination region and a light illumination intensity distribution provided by the fly-eye lens according to the first embodiment illuminating the light modulation part of the light modulation device.

The fly-eye lens 10 has been described to include the incident lenses with three types of vertical lens width and the emission lenses with two types of vertical lens width, to set the illumination region EA. Here, as shown in FIGS. 13A and 13B, the second illumination region E2 may be formed by a greater number of ranges. For example, the fly-eye lens may be formed with the second incident lenses 11aA and the second incident lenses 11bB with five types of vertical lens width, so that the second illumination region E2 is formed by the first range 1Eb to the fifth range 5Eb. The illumination state of the illumination region EA with increased ranges can be more minutely set. Note that, FIG. 13B shows, by the gray scale, the light illumination intensity distribution of the illumination region EA including the first illumination region E1 and the second illumination region E2 including the first range 1Eb to fifth range 5Eb (a whiter tone represents higher light illumination intensity). In the fly-eye lens 10, when the vertical lens width of the incident lenses is varied, the vertical lens width of the emission lenses receiving light to be condensed may not be varied. In the fly-eye lens 10, the range of the illumination region is controlled by the shape of the incident lenses, and the light emission direction is controlled by the position of the lens vertices TLb of the emission lenses. Hence, the emission lenses may have a single vertical lens width.

Variation of Fly-Eye Lens

Figure 14A:
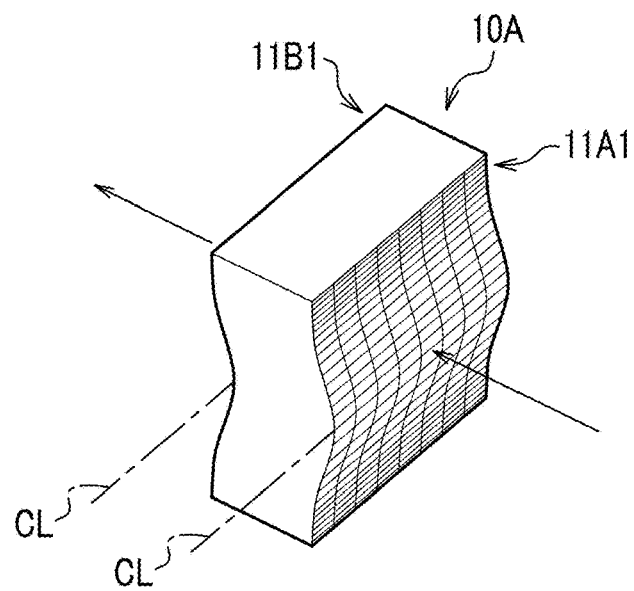
FIG. 14A is a perspective view schematically showing other configuration of the fly-eye lens.

As shown in FIG. 14A, a fly-eye lens 10A may be obtained by inverting the concave and convex of the incident lens assemblage 11A and the emission lens assemblage 11B of the fly-eye lens 10 shown in FIG. 1. That is, in the fly-eye lens 10A, the incident lens assemblage 11A1 is convex around the lens surface center CL, and concave at the upper and lower positions with respect to the lens surface center. In the fly-eye lens 10A, the emission lens assemblage 11B1 is concave around the lens surface center CL, and concave at the upper and lower positions with respect to the lens surface center CL. In the fly-eye lens 10A, the first incident lenses 11a1 and the first emission lenses 11b1 with a greater vertical lens width are disposed around the lens surface center CL. On the upper and lower sides with respect to the first incident lenses 11a1, the second incident lenses 11aA of which vertical lens width becomes gradually smaller toward the upper and lower edges are disposed so as to have horizontal symmetry. On the upper and lower sides with reference to the first emission lens 11b1, the second emission lenses 11bB of which vertical lens width becomes smaller toward the upper and lower edges are disposed so as to have horizontal symmetry. The fly-eye lens 10A in this configuration similarly properly sets the first illumination region and the second illumination region in the illumination region. In the fly-eye lens 10A, the second emission lenses 11bB may all be the same in the vertical lens width.

Furthermore, the fly-eye lens may have a plurality of cylindrical lens aligned in the column direction, each being one in number in the row direction, to form the incident lenses and the emission lenses. One fly-eye lens may employ a single or a plurality of groups of lenses of which vertical lens width is varied in the column direction. In the case in which cylindrical lenses are employed, the whole illumination region is illuminated having the illumination ranges illuminated by the lens groups varied in the vertical direction with an equivalent illumination width in the horizontal direction. The present disclosure is not limited to the configuration in which one lens is aligned in the vertical direction as the fly-eye lens. It goes without saying that two or three cylindrical lenses may be arranged in the horizontal direction to be lens rows, which lens rows may be repetitively arranged in the vertical direction.

Variation of Illumination Region

Figure 14B:
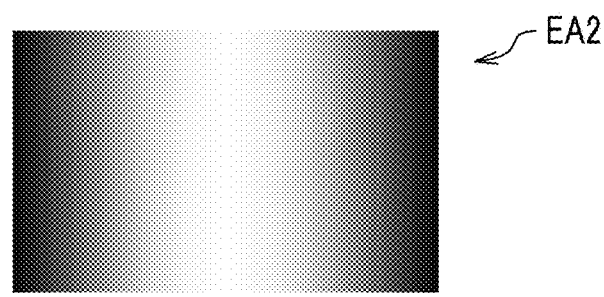
FIG. 14B is an explanatory illustration schematically showing other configuration of the light illumination intensity distribution of the illumination region.
Figure 14C:
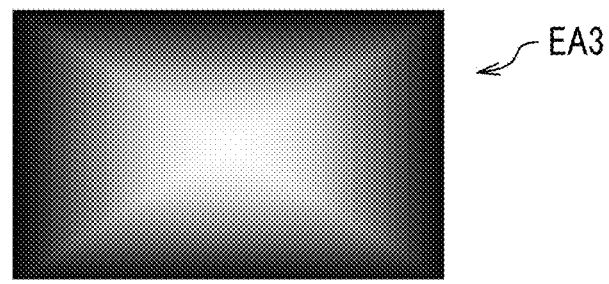
FIG. 14C is an explanatory illustration schematically showing other configuration of the light illumination intensity distribution of the illumination region.

Without being limited to the light illumination intensity distribution of the illumination region EA shown in FIG. 13B, the fly-eye lens 10, 10A may be configured as shown in FIGS. 14B and 14C, for example. In FIG. 14B, the light illumination intensity distribution of the whole illumination region EA2 is higher at the central portion and lower toward the right and left edges. Such an illumination region EA2 can be attained by having the shape of the incident lenses 11a set and the lens vertices TLb of the emission lenses 11b of the fly-eye lens eccentrically positioned. For example, similarly to the second emission lens 11bB, the first emission lenses 11b1 may have the lens vertices TLb eccentrically positioned so that the odd numbered and even numbered lenses are respectively allotted to the left and right sides of the illumination region EA to spread the range illuminated by the light emitted from the lenses in the horizontal direction (the X-direction). Alternatively, the light illumination intensity distribution as in the illumination region EA2 may be attained by having the lens vertices TLb eccentrically positioned so that the light beams from the lens groups of the second emission lens 11bB fall within the range of the first illumination region E1 in the horizontal direction.

Similarly, as shown in FIG. 14C, the light illumination intensity distribution in the illumination region EA3 is higher about its center and lower toward its four sides. Such an illumination region EA3 can be attained by having the lens vertices TLb of the first emission lenses 11b1 and the second emission lenses 11bB of the fly-eye lens eccentrically positioned.

The eccentrically positioning the lens vertices TLb may be performed, as described above, for each lens group or lens rows, to form the fly-eye lens. Because light beams from the incident lenses 11a are condensed in the fly-eye lens 10, 10A, the emission lenses 11b may be equivalent to each other in the vertical lens width.

The first illumination region E1 may be formed by, in the whole illumination region EA, a group of regions illuminated at different locations with light emitted from rows of the first emission lenses 11b1, which regions are the same as one another in the vertical region size and differ from one another in the horizontal region size.

The second illumination region E2 may be formed by, in the whole illumination region EA, a group of regions illuminated at different locations with light emitted from rows of the second emission lenses 11bB, which regions differ from one another in the vertical region size and the same as one another in the horizontal region size.

The first illumination region E1 may be formed by, in the whole illumination region, a group of regions illuminated at different locations with light emitted from rows of the first emission lenses 11b1, which regions are the same as one another in the vertical region size and the horizontal region size.

The second illumination region E2 may be formed by, in the whole illumination region EA, a group of regions illuminated at different locations with light emitted from rows of the second emission lenses 11bB, which regions are the same as one another in the vertical region size and the horizontal region size.

Illumination Optical Device

Figure 15:
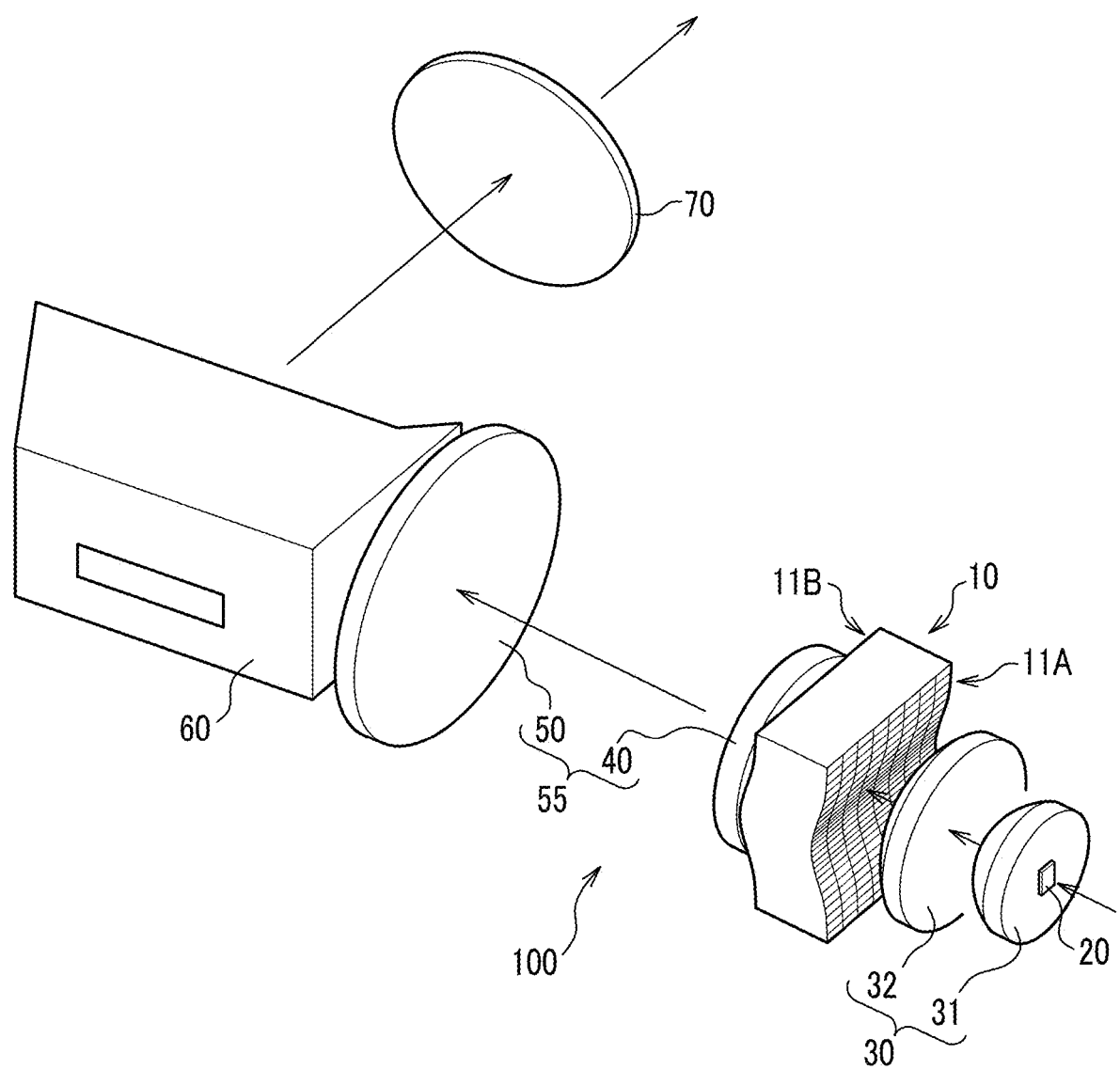
FIG. 15 is a perspective view schematically showing the whole illumination optical device.

Next, with reference to FIG. 15, a description will be given of an illumination optical device 100. In this configuration, the fly-eye lens 10 is exemplarily used.

The illumination optical device 100 is used as any of various lighting devices for a vehicle, a ship, or an aircraft, for example. The illumination optical device 100 includes: a light source 20; a first optical member 30 configured to convert light from the light source 20 to a collimated light beam; the fly-eye lens 10 configured to receive the light from the first optical member 30 and emit the light with a desired light illumination intensity distribution; a second optical member 55 configured to adjust the light from the fly-eye lens 10; a light modulation device 60 configured to receive the light from the second optical member 55 and emit the light in a different optical path; and a projection lens 70 configured to project the light from the light modulation device 60. These elements from the light source 20 to the projection lens 70 are housed in a frame.

The light source 20 is configured to emit, for example, white-color light. The light source 20 may be, for example, a light emitting device that includes a light emitting element housed in a package, and a light-transmissive member. The light emitting element may be any known light emitting element. For example, the light emitting element may preferably be a light emitting diode or a laser diode. The light emitting element may have any wavelength. For example, a light emitting element emitting blue-color or green-color light may be formed using a nitride-based semiconductor ($In_XAl_YGa_{1-X-Y}N$, $0 \leq X$, $0 \leq Y$, $X+Y \leq 1$), or a GaP. A light emitting element emitting red-color light may be formed using GaAlAs, AlInGaP or the like. The light emitting element may be a semiconductor light emitting element formed using any material other than the foregoing materials. The composition, the color of emitted light, and the number of the light emitting element may be selected as appropriate in accordance with the intended use.

The package is formed of, for example, conductive members such as a lead frame or wires with which the light emitting element is mounted, ceramic, and a resin molded body. The resin molded body of the package is a reflective member formed of epoxy resin or silicone resin. The ceramic of the package is alumina or aluminum nitride. Electrical connection between the light emitting element and the outside is established via the conductive member. The light-transmissive member is provided to cover the light emitting element mounted on the inner lead portion of the lead frame. The light-transmissive member may be configured to include a wavelength conversion member such as a fluorescent material or a diffusing member.

As an example, the first optical member 30 is a collimating lens. In the present embodiment, the first collimating lens 31 and the second collimating lens 32 converts light from the light source 20 into a collimated light beam. The collimating lens in this configuration may be a compound lens such as a combination of a concave lens and a convex lens, a combination of convex lenses, or a simple lens, so long as the collimating lens is capable of converting light from the light source 20 to a collimated light beam.

The fly-eye lens 10 is configured as described above. The fly-eye lens 10 is set to emit light in the illuminated surface of the light modulation device 60 in a desired light illumination intensity distribution. So long as a desired light illumination intensity distribution is attained, the number of lens groups or lens rows of the fly-eye lens 10 is not specified. The shape of the lens surface of the incident lens assemblage of the fly-eye lens 10 or the shape of the lens surface of the emission lens assemblage is not specified.

The second optical member 55 is disposed on the optical path between the fly-eye lens 10 and the light modulation device 60 so as to cause light from the fly-eye lens 10 to become incident on the illuminated surface of the light modulation device 60. In the present embodiment, the second optical member 55 is a condenser lens 40 and a field lens 50. The condenser lens 40 is configured to cause light from the fly-eye lens 10 to be superimposed on the light modulation device 60. The condenser lens 40 condenses light emitted from the fly-eye lens 10 to fall within a range corresponding to the illuminated surface of the light modulation device 60 via the field lens 50. The field lens 50 adjusts the angle of light becoming incident on the light modulation device 60.

The light modulation device 60 is configured to change the optical path of light emitted from the fly-eye lens 10 with a desired light illumination intensity distribution via the second optical member 55, and output the light of which distribution is variable. The light modulation device 60 is, for example, a DMD (digital micromirror device). The light modulation device 60 controls a plurality of micromirrors to selectively produce light. Because the supplied light already has a desired light illumination intensity distribution, the light modulation device 60 can reflect the light with a 100% gray scale distribution by the micromirrors without any loss in luminous flux, to send the light to the projection lens 70. That is, the light modulation device 60 is capable of realizing, for example as a luminous intensity distribution required of a headlamp, the characteristic in which the intensity is higher about the center and lower toward the periphery of the whole illumination region without any loss in luminous flux.

The projection lens 70 is configured to spread the light sent from the light modulation device 60 and projects the light on the image-forming plane. The projection lens 70 may be a simple lens or a compound lens. The projection lens 70 sends the light received from the light modulation device 60 to the image-forming plane at a preset distance in a desired light illumination intensity distribution.

The illumination optical device 100 configured as described above adjusts the light from the light source 20 to have a desired light illumination intensity distribution through the fly-eye lens 10, and outputs the light through the light modulation device 60 without any loss in luminous flux, and to emit the light to the outside through the projection lens 70. The fly-eye lens 10, 10A is easily formed without a great height step.

Variation of Illumination Optical Device

Figure 16A:
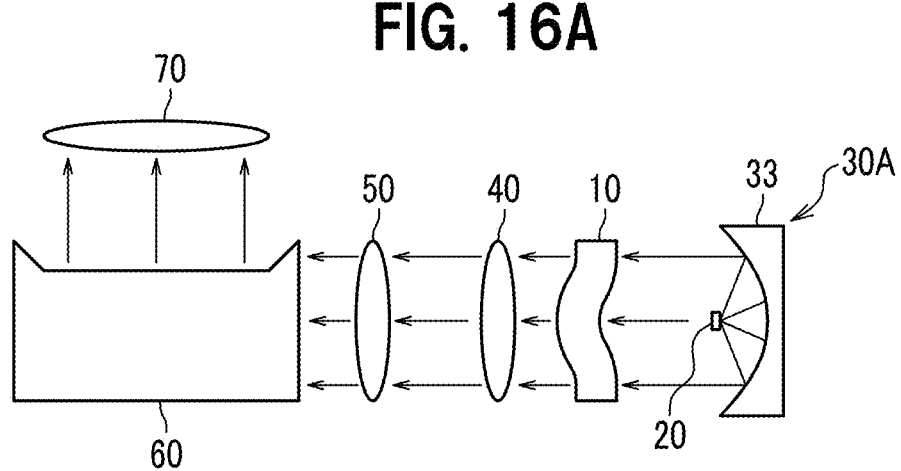
FIG. 16A is an explanatory illustration schematically showing the configuration in which a reflecting optical system is used as the first optical member in the illumination optical device.
Figure 16B:
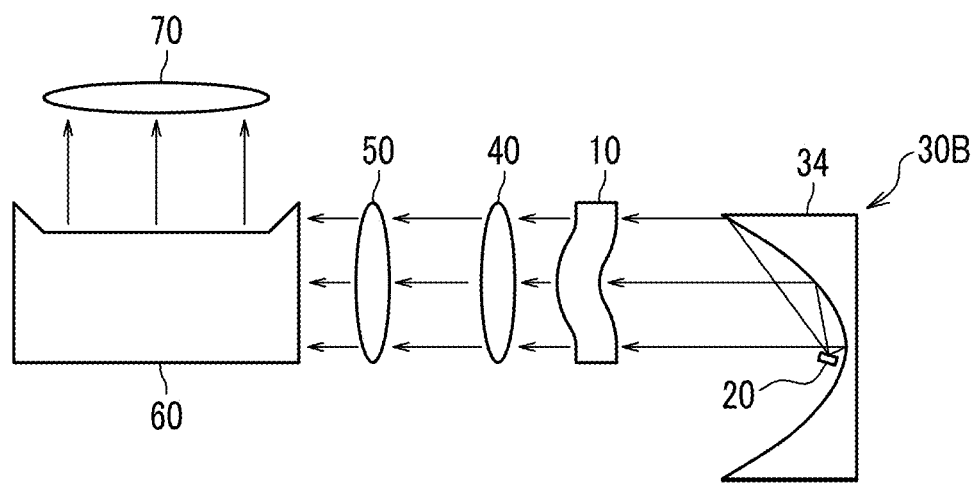
FIG. 16B is an explanatory illustration schematically showing the configuration in which other reflecting optical system is used as the first optical member in the illumination optical device.

The illumination optical device 100 may have, as the first optical member 30, the configuration shown in FIGS. 16A and 16B.

As shown in FIG. 16A, a paraboloid reflecting mirror 33 may be provided as a first optical member 30A. The paraboloid reflecting mirror 33 is disposed to reflect light emitted from the light source 20, so that the light becomes incident on the fly-eye lens 10 as a collimated light beam. In using the paraboloid reflecting mirror 33, the light source 20 is disposed to emit light toward the paraboloid reflecting mirror 33. The light source 20 is disposed at the focus position of the paraboloid reflecting mirror 33.

As shown in FIG. 16B, an oval reflecting mirror 34 may be provided as a first optical member 30B. Using the upper half of the oval curved surface, the oval reflecting mirror 34 reflects light from the light source 20 as a collimated light beam. The light source 20 is disposed by an angle and at a position so that the light emitted toward the oval reflecting mirror 34 becomes a collimated light beam.

Variation of Configurations

As described above, the configurations of the fly-eye lens 10, 10A and the illumination optical device 100 are not specified to those described above.

For example, the first illumination region E1 may be formed of a region divided into a plurality of sections. While the second illumination region E2 has been described, as an example, to be formed by two ranges, the second illumination region E2 may be formed of one, three, or four ranges, or six to twelve or more ranges. While the second illumination region E2 has been described to be formed by a plurality of ranges differing from one another in the illuminated area, the ranges may be the same in the area and different from one another while varied in the illuminated positioned to form the second illumination region E2. The lens groups of the fly-eye lens should just be the same in the horizontal lens width, and the vertical lens width may not be in a gradually increasing or reducing order. That is, in the fly-eye lens, for example, the even numbered lens group may be disposed after the odd numbered lens group so as to have horizontal symmetry with reference to the lens surface center CL. The fly-eye lens has been described to include the incident lenses 11a of the first incident lenses and the second incident lenses, and the emission lenses 11b of the first emission lenses and the second emission lenses, which are differing from each other just in the vertical lens width and the same in the function. That is, the numbering of the first and the second is just for the convenience of description style. While the lenses and the lens rows of the fly-eye lens have been described from the first in order on the incident side and the emission side, the numbering is just for the convenience of description style. While the fly-eye lens 10, 10A has been described that two lens groups having vertical symmetry with respect to the lens surface CL illuminate the same region or range, one lens group may illuminate one region or range.

As to the illumination region EA, the distinction has been drawn between the first illumination region E1 and the second illumination region E2 for their being different in the vertical illumination width and in the illumination position. Here, the illumination region EA may be formed of a plurality of regions, sections each forming the region, or subsections each forming the section. In the case in which the illumination region EA is formed of a plurality of regions, sections each forming the region, or subsections each forming the section, as shown in FIGS. 8A to 8C, 11, and 12A to 12C, the lens vertices should be eccentrically positioned for each lens, for each lens row, or for each lens group. Note that, the illumination region EA is formed of a group of regions (including ranges, sections and subsections) in which light is illuminated from the emission lenses of the fly-eye lens.

In the fly-eye lens 10, 10A, in addition to the lens width being set to be the same in one of the column direction and the row direction, the number of lens groups or the number of lens rows forming each lens group may be set to be the same, partially different, or entirely different. That is, adjusting the lens rows of the lens group improves flexibility in setting the illumination region EA. The fly-eye lens 10, 10A may dispense with the lens upper frame part 12, the lens lower frame part 13, the lens left frame part 14, and the lens right frame part 15, and may have simple lenses bonded to one another (see FIG. 1). While the fly-eye lens 10, 10A has been described to have emission lenses that are equivalent to one another in the vertical lens width, the emission lenses may have the vertical lens width varied similarly to the opposed lenses of the incident lenses. In the fly-eye lens, the number of the incident lenses and the emission lenses aligned in the row direction may be even or odd. When the number of the lens is an even number, the lenses are formed so that the lens vertex of the central lens in the lens row is not eccentrically positioned (the lens vertex agrees with the optical axis of the lens).

As to the second emission lenses 11bB, it has been described that the horizontal lens width is set to attain the illuminated area half or less as great as the maximum region in the second illumination region. Here, the maximum region of the illumination region in the second illumination region may be greater than the total area of the horizontal lens width of two lenses. That is, in the fly-eye lens, the illumination region should be formed by the total regions of the plurality of lenses, to attain a desired light illumination intensity distribution. Furthermore, when the horizontal lens width is the same in the vertical column direction (the Z-direction), the horizontal lens width may not be the same in the adjacent vertical column direction. The horizontal lens width being the same in the vertical direction provides the fly-eye lens with a smaller step height. In the case in which the horizontal lens width is different for each vertical column, the illuminated regions are varied in the area. This improves the flexibility in setting the light illumination intensity distribution in the illumination region.

The fly-eye lens may be formed by having the lenses connected so that the shape of the lens surface of the incident lenses and the emission lenses becomes a flat plane in the vertical direction. The fly-eye lens may have at least one of a convex surface and a concave surface formed at the lens surface on the incident lens side, and the emission lens may be formed to be substantially parallel to the lens surface on the incident lens side.

As to the illumination optical device 100, while the light modulation device 60 has been exemplarily described as a DMD, the light modulation device 60 may be other device, such as a spatial light modulator.

INDUSTRIAL APPLICABILITY

The fly-eye lens and the illumination optical device of the present disclosure is applicable to an optical system or an illumination device of a light source for any of various lighting devices of a vehicle such as a motorcycle or an automobile, or a conveyance such as a ship or an aircraft. The fly-eye lens and the illumination optical device of the present disclosure are applicable also to an optical system or an illumination device of any of various illumination light sources such as spotlight, a light source for a display, an onboard component, an interior lighting, an outdoor lighting and the like.

DENOTATION OF REFERENCE NUMERALS

10, 10A: fly-eye lens
11A: incident lens assemblage
11B: emission lens assemblage
11a: incident lens
11b: emission lens
11a1: first incident lens
11b1: first emission lens
11aA: second incident lens
11bB: second emission lens 11a2: incident 1st lens
11b2: emission 1st lens
11a3: incident 2nd lens
11b3: emission 2nd lens
11NL1: first incident lens group
11U11: first emission lens group
11N11: incident 1st lens row
11U11: emission 1st lens row
11N12: incident 2nd lens row
11U12: emission 2nd lens row
11N13: incident 3rd lens row
11U13: emission 3rd lens row
11NLA: second incident lens group
11ULB: second emission lens group
11NL2: incident 1st lens group
11UL2: emission 1st lens group
11N21: incident 1st lens row
11U21: emission 1st lens row
11N22: incident 2nd lens row
11U22: emission 2nd lens row
11N23: incident 3rd lens row
11U23: emission 3rd lens row
11N24: incident 4th lens row
11U24: emission 4th lens row
11NL3: incident 2nd lens group
11UL3: emission 2nd lens group
11N31: incident 1st lens row
11U31: emission 1st lens row
11N32: incident 2nd lens row
11U32: emission 2nd lens row
11N33: incident 3rd lens row
11U33: emission 3rd lens row
11N34: incident 4th lens row
11U34: emission 4th lens row
11N35: incident 5th lens row
11U35: emission 5th lens row
11N36: incident 6th lens row
11U36: emission 6th lens row
11RA1: incident-side concave surface
11RB1: emission-side convex surface
11RA2: incident-side convex surface
11RB2: emission-side concave surface
12: lens upper frame part
13: lens lower frame part
14: lens left frame part
15: lens right frame part
20: light source
30: first optical member
31: first collimating lens
32: second collimating lens
40: condenser lens
50: field lens
55: second optical member
60: light modulation device
70: projection lens
CL: lens surface center
E1: first illumination region
E2: second: illumination region
EA, EA1, EA2: illumination region
HCL: region center
TLb: lens vertex of emission lens
TLa: lens vertex of incident lens
L1Eb: other section
R1Eb: one section
L1Eb1, L1Eb2, L1Eb3, L1Eb4: other subsection
R1Eb1, R1Eb2, R1Eb3, R1Eb4: one subsection

What is claimed is:

1. A fly-eye lens comprising:
an incident lens assemblage comprising a plurality of incident lenses that are aligned in a vertical direction, wherein each of the incident lenses has a quadrangular shape, wherein horizontal lens widths of the incident lens are the same, and wherein vertical lens widths of at least some of the incident lens are different from one another; and
an emission lens assemblage comprising a plurality of emission lenses that are aligned in the vertical direction so as to be optically opposed to the incident lenses, wherein each of the emission lenses has a quadrangular shape, and wherein horizontal lens widths of the emission lenses lens are the same;
wherein a dimension of the quadrangular shape of the incident lenses is set such that, on an illuminated surface, a preset illumination region is attained by a group of illumination ranges, each illuminated with light from one or more of the incident lenses, and wherein lens vertices of the incident lenses are eccentrically positioned such that light supplied by the incident lenses to the emission lenses is optically opposed to the incident lenses; and
wherein a dimension of the quadrangular shape of the emission lenses is set and lens vertices of the emission lenses are positioned such that any of the plurality of illumination ranges forming the preset illumination region is attained, and such that at least part of the illumination ranges are overlapped with each other.

2. The fly-eye lens according to claim 1, wherein:
the incident lens assemblage comprises one or more incident lens rows that are adjacent in the vertical direction, each of the one or more incident lens rows comprising a plurality of the incident lenses that are aligned in the horizontal direction;
the emission lens assemblage comprises one or more emission lens rows that are adjacent in the vertical direction, each of the one or more emission lens rows comprising a plurality of the emission lenses that are aligned in the horizontal direction; and
any of the illumination ranges is illuminated with light from each of the rows of the emission lenses.

3. The fly-eye lens according to claim 1, wherein:
the incident lenses comprise:
one or more first incident lens rows that are adjacent in the vertical direction, each of the one or more first incident lens rows comprising a plurality of first incident lenses that are aligned in the horizontal direction, and
one or more second incident lens rows that are adjacent in the vertical direction, each of the one or more second incident lens rows comprising a plurality of second incident lenses that are aligned in the horizontal direction, wherein the one or more second incident lens rows are continuous with the one or more first incident lens rows, and wherein a vertical lens width of the second incident lenses is smaller in a vertical lens width of the first incident lenses;
the emission lenses comprise:
one or more first emission lens rows that are adjacent in the vertical direction, each of the one or more first emission lens rows comprising a plurality of first emission lenses that are aligned in the horizontal direction, and
one or more second emission lens rows that are adjacent in the vertical direction, each of the one or more second emission lens rows comprising a plurality of second emission lenses that are aligned in the horizontal direction, wherein the one or more second emission lens rows are continuous with the one or more first emission lens rows;

the illumination region includes a first illumination region illuminated with light emitted from the first emission lenses and a second illumination region illuminated with light emitted from the second emission lenses; and the lens vertices of the emission lenses are positioned so as to emit light, by each lens row, in the first illumination region or the second illumination region of the illumination range.

4. The fly-eye lens according to claim 3, wherein:

the first incident lenses and the second incident lenses each form a lens group by a preset number of the incident lens rows, the lens group has the quadrangular shape formed to illuminate any of the illumination ranges;

the first emission lenses and the second emission lenses each form a lens group by a preset number of the emission lens rows, each emission lens of the lens groups has the lens vertices positioned so as to illuminate any of the illumination ranges; and a number of first incident lenses in the lens group of the first incident lenses is equal to a number of first emission lenses in the lens group of the first emission lenses, and a number of second incident lenses in the lens group of the second incident lenses is equal to a number of second emission lenses in the lens group of the second emission lenses.

5. The fly-eye lens according to claim 3, wherein:

the incident lens assemblage comprises:

a first incident lens group and a second incident lens group that are adjacent in the vertical direction, wherein the first incident lens group comprises one or more first incident lens rows that are adjacent in the vertical direction, each of the one or more first incident lens rows comprising a plurality of the first incident lenses that are aligned in the horizontal direction, and wherein the second incident lens group comprises one or more second incident lens rows that are adjacent in the vertical direction, each of the one or more second incident lens rows comprising a plurality of the second incident lenses that are aligned in the horizontal direction, the emission lens assemblage comprises:

a first emission lens group and a second emission lens group that are adjacent in the vertical direction, wherein the first emission lens group comprises one or more first emission lens rows that are adjacent in the vertical direction, each of the one or more first emission lens rows comprising a plurality of the first emission lenses that are aligned in the horizontal direction, and wherein the second emission lens group comprises one or more second emission lens rows that are adjacent in the vertical direction, each of the one or more second emission lens rows comprising a plurality of the second emission lenses that are aligned in the horizontal direction;

a vertical lens width of the first incident lenses in the first incident lens group is different than a vertical lens width of the second incident lenses in the second incident lens group;

(i) vertical lens widths of the second emission lenses in the second emission lens group are the same, or (ii) vertical lens widths of both the first emission lenses in the first emission lens group and the second emission lenses in the second emission lens group are the same; and a number of lens groups formed by the first incident lenses is the same as a number of lens groups formed by the first emission lenses, and a number of lens groups formed by the second incident lenses is the same as a number of lens groups formed by the second emission lenses.

6. The fly-eye lens according to claim 4, wherein:

the incident lens assemblage has the lens group of the first incident lens disposed on each of an upper side and a lower side with reference to the group of the second incident lenses in the vertical direction; and the emission lens assemblage has the lens group of the first emission lenses disposed on each of an upper side and a lower side with reference to the second emission lens in the vertical direction.

7. The fly-eye lens according to claim 4, wherein:

the incident lens assemblage has the lens group of the second incident lenses disposed on each of an upper side and a lower side with reference to the group of the first incident lenses; and the emission lens assemblage has the lens group of the second emission lenses disposed on each of an upper side and a lower side with reference to the group of the first emission lenses.

8. The fly-eye lens according to claim 4, wherein:

the lens groups of the second incident lenses aligned in the vertical direction is greater in number than the lens groups of the first incident lenses; and the lens groups of the second emission lenses aligned in the vertical direction is greater in number than the lens groups of the first emission lenses.

9. The fly-eye lens according to claim 4, wherein:

among a plurality of lens groups of the second incident lenses aligned in the vertical direction, at least one lens group is different in number of lens rows from other lens groups;

among a plurality of lens groups of the second emission lenses aligned in the vertical direction, at least one lens group is different in number of lens rows from other lens groups; and the group of the second incident lenses and the group of the second emission lenses differing in the number of lens rows are optically opposed to each other, and the same as each other in the difference in the number of the lens rows.

10. The fly-eye lens according to claim 3, wherein lens vertices of the second emission lenses are eccentrically positioned such that the second illumination region has vertical symmetry with respect to a center of the first illumination region.

11. The fly-eye lens according to claim 3, wherein lens vertices of the second emission lenses emitting light in the second illumination region are eccentrically positioned so as to attain a light illumination intensity distribution of the second illumination region in which a light illumination intensity is higher around a center and lower toward a periphery of the whole second illumination region.

12. The fly-eye lens according to claim 3, wherein:

in the incident lens assemblage, a shape of a lens surface obtained by connecting lens vertices of the first incident lenses and the second incident lenses is parallel to the horizontal direction and one of a concave surface and a convex surface in the vertical direction; and in the emission lens assemblage, the first emission lenses and the second emission lenses are connected to each other to form a curved surface substantially parallel to the incident lens assemblage.

13. The fly-eye lens according to claim 3, wherein:

lens vertices of the first emission lenses are eccentrically positioned such that a preset light illumination intensity distribution is attained in the first illumination region by the first emission lenses emitting light in different illumination ranges in the first illumination region for each lens row; and lens vertices of the second emission lenses are eccentrically positioned such that a preset light illumination intensity distribution is attained in the second illumination region by the second emission lenses emitting light in different illumination ranges in the second illumination region for each lens row.

14. The fly-eye lens according to claim 3, wherein:

lens vertices of the first emission lenses are eccentrically positioned so as to emit light in the first illumination region for each section in the horizontal direction for each aligned lens row; and lens vertices of the second emission lenses are eccentrically positioned so as to emit light in the second illumination region for each section in the horizontal direction for each aligned lens row.

15. The fly-eye lens according to claim 3, wherein lens vertices in the lens rows of the emission lens are eccentrically positioned such that, in the first illumination region or in the second illumination region, the first illumination region or the second illumination region is formed by a group of illumination ranges that become greater in the horizontal direction toward a lens surface center in the vertical direction.

16. The fly-eye lens according to claim 3, wherein:

the first illumination region is formed of, in a whole illumination region being set, a group of regions illuminated at different locations with light emitted from rows of the first emission lenses, which regions are the same as one another in a vertical region size and differ from one another in a horizontal region size; and the second illumination region is formed of, in the whole illumination region, a group of regions being illuminated at different locations with light emitted from rows of the second emission lenses, which regions differ from one another in the vertical region size and the same as one another in the horizontal region size.

17. The fly-eye lens according to claim 3, wherein:

the first illumination region is formed of, in a whole illumination region being set, a group of regions being illuminated at different locations with light emitted from rows of the first emission lenses, which regions are the same as one another in a vertical region size and a horizontal region size; and the second illumination region is formed of, in the whole illumination region being set, a group of regions being illuminated at different locations with light emitted from rows of the second emission lenses, which regions are the same in the vertical region size and the horizontal region size.

18. A fly-eye lens comprising:

an incident lens assemblage comprising a plurality of first incident lenses that have a quadrangular shape and a plurality of second incident lenses that have a quadrangular shape, wherein a horizontal lens width of the second incident lenses is the same as a horizontal lens width of the first incident lenses, wherein a vertical lens width of the second incident lenses is smaller than a vertical lens width of the first incident lenses, and wherein the first incident lenses and the second incident lenses are aligned in a vertical direction and a horizontal direction with their horizontal lens widths being the same in a vertical column; and an emission lens assemblage comprising a plurality of first emission lenses that have a quadrangular shape and that are optically opposed to the first incident lenses, and a plurality of second emission lenses that have a quadrangular shape and that are optically opposed to the second incident lenses, the first emission lenses and the second emission lenses being aligned in the vertical direction and the horizontal direction with their horizontal lens width being the same in a vertical column;

wherein a dimension of the quadrangular shape of first incident lenses is set such that, on an illuminated surface, a preset first illumination region is attained, and wherein lens vertices of the first incident lenses are positioned such that light supplied by the first incident lenses to the first emission lenses is optically opposed to the first incident lenses;

wherein a dimension of the quadrangular shape of the second incident lenses is set such that a preset second illumination region is obtained, an area of the second illumination region being smaller than an area of the first illumination region, and the second illumination region being at least partially overlapped on the first illumination region on the illuminated surface, and wherein lens vertices of the second incident lenses are positioned such that light supplied by the second incident lenses to the second emission lenses is optically opposed to the second incident lenses;

wherein a dimension of the quadrangular shape of the first emission lenses is set and lens vertices of the first emission lenses are eccentrically positioned so as to emit light in the first illumination region; and a dimension of the quadrangular shape of the second emission lenses is set and lens vertices of the second emission lenses are positioned so as to emit light in the second illumination region.

19. An illumination optical device comprising:

a first optical member disposed in an optical path from a light source and configured to convert light from the light source to a substantially collimated light beam;

a fly-eye lens according to claim 18, which is configured to receive light from the first optical member and emit the light with a gray scale distribution;

a second optical member disposed in an optical path of the light from the fly-eye lens;

a light modulation device configured to receive light from the second optical member and emit the light with its optical path changed; and a projection lens configured to project the light from the light modulation device.

20. The illumination optical device according to claim 19, wherein the light source is a light emitting diode or a laser diode.

21. The illumination optical device according to claim 19, wherein the first optical member is a collimating lens configured to convert light from the light source to a collimated light beam.

22. The illumination optical device according to claim 19, wherein the first optical member is a reflecting mirror configured to reflect light from the light source to be a collimated light beam.

* * * * *